US011447011B2

United States Patent
Hirata et al.

(10) Patent No.: US 11,447,011 B2
(45) Date of Patent: Sep. 20, 2022

(54) INFORMATION DISPLAY APPARATUS

(71) Applicant: MAXELL, LTD., Kyoto (JP)

(72) Inventors: Koji Hirata, Kyoto (JP); Yasuhiko Kunii, Kyoto (JP)

(73) Assignee: MAXELL, LTD., Kyoto (JP)

( * ) Notice: Subject to any disclaimer, the term of this patent is extended or adjusted under 35 U.S.C. 154(b) by 128 days.

(21) Appl. No.: 16/754,763

(22) PCT Filed: Oct. 5, 2018

(86) PCT No.: PCT/JP2018/037460
§ 371 (c)(1),
(2) Date: Apr. 9, 2020

(87) PCT Pub. No.: WO2019/073935
PCT Pub. Date: Apr. 18, 2019

(65) Prior Publication Data
US 2020/0298704 A1 Sep. 24, 2020

(30) Foreign Application Priority Data
Oct. 10, 2017 (JP) .............................. JP2017-196578

(51) Int. Cl.
*B60K 35/00* (2006.01)
*G02B 26/08* (2006.01)
(Continued)

(52) U.S. Cl.
CPC .......... *B60K 35/00* (2013.01); *G02B 26/0833* (2013.01); *G02B 26/10* (2013.01);
(Continued)

(58) Field of Classification Search
CPC .... H04N 13/346; H04N 13/30; H04N 13/363; H04N 5/74; G02B 26/10; G02B 26/0833;
(Continued)

(56) References Cited

U.S. PATENT DOCUMENTS 4,999,011 A * 3/1991 Suzuki ................ H04N 13/302
353/14
9,678,341 B2 * 6/2017 Kim ...................... G02B 30/27
(Continued)

FOREIGN PATENT DOCUMENTS

| JP | 10-293264 A | 11/1998 |
| JP | 2007-272350 A | 10/2007 |

(Continued)

OTHER PUBLICATIONS

International Search Report of PCT/JP2018/037460 dated Dec. 25, 2018.

*Primary Examiner* — Christopher E Leiby
(74) *Attorney, Agent, or Firm* — Mattingly & Malur, PC

(57) ABSTRACT

In an information display apparatus displaying information onto a vehicle, an information display apparatus capable of acquiring a lot of pieces of image information while reducing point-of-view motion of a viewer is provided. An information display apparatus displaying information onto a vehicle includes a first information display apparatus displaying image information of a virtual image by allowing a windshield glass of a vehicle to reflect light, a second information display apparatus acquiring a practical image by scanning the windshield glass with laser light using a MEMS element and a third information display apparatus using an instrument panel of the vehicle.

12 Claims, 13 Drawing Sheets

(51) Int. Cl.
*G02B 26/10* (2006.01)
*G02B 27/01* (2006.01)

(52) U.S. Cl.
CPC .. *G02B 27/0179* (2013.01); *B60K 2370/1529* (2019.05); *B60K 2370/31* (2019.05); *B60K 2370/347* (2019.05); *B60K 2370/785* (2019.05); *G02B 2027/0183* (2013.01)

(58) Field of Classification Search
CPC ............. G02B 26/101; G02B 27/0179; G02B 27/0101; G02B 2027/0185; G02B 2027/0183; B60R 11/02; B60K 35/00; B60K 2370/184; B60K 2370/31; B60K 2370/347; B60K 2370/1876; B60K 2370/785; B60K 2370/182; B60K 2370/1868; B60K 2370/1529
See application file for complete search history.

(56) References Cited

U.S. PATENT DOCUMENTS

| | | | | |
|---|---|---|---|---|
| 10,055,867 | B2* | 8/2018 | Law | H04N 13/307 |
| 10,156,720 | B2* | 12/2018 | Ando | G02B 27/01 |
| 10,940,759 | B2* | 3/2021 | Helot | G09G 3/003 |
| 10,994,613 | B2* | 5/2021 | Hirata | H04N 9/3194 |
| 2009/0160736 | A1* | 6/2009 | Shikita | G02B 27/0101 345/7 |
| 2009/0278677 | A1* | 11/2009 | Arie | B60K 37/02 340/461 |
| 2013/0265646 | A1* | 10/2013 | Sakai | G02B 27/01 359/631 |
| 2014/0036374 | A1* | 2/2014 | Lescure | G02B 27/0101 359/630 |
| 2016/0178902 | A1* | 6/2016 | Ando | B60R 1/00 348/115 |
| 2016/0195719 | A1 | 7/2016 | Yonetani | |
| 2017/0374330 | A1 | 12/2017 | Okazaki | |
| 2018/0129042 | A1* | 5/2018 | Yamazoe | G02B 13/16 |
| 2019/0080496 | A1* | 3/2019 | Wakatsuki | G06T 11/00 |
| 2019/0086661 | A1* | 3/2019 | Misawa | B60K 35/00 |
| 2019/0116344 | A1* | 4/2019 | Nguyen | H04N 9/317 |
| 2019/0265468 | A1* | 8/2019 | Hirata | B60K 35/00 |
| 2020/0018977 | A1* | 1/2020 | Qin | G02B 27/0101 |

FOREIGN PATENT DOCUMENTS

| | | |
|---|---|---|
| JP | 2015-194707 A | 11/2015 |
| JP | 2016-156974 A | 9/2016 |
| JP | 2017-105291 A | 6/2017 |
| JP | 2017-134226 A | 8/2017 |
| JP | 2017-165163 A | 9/2017 |
| WO | 1017/061019 A1 | 4/2017 |

* cited by examiner

FIG. 1
(A)
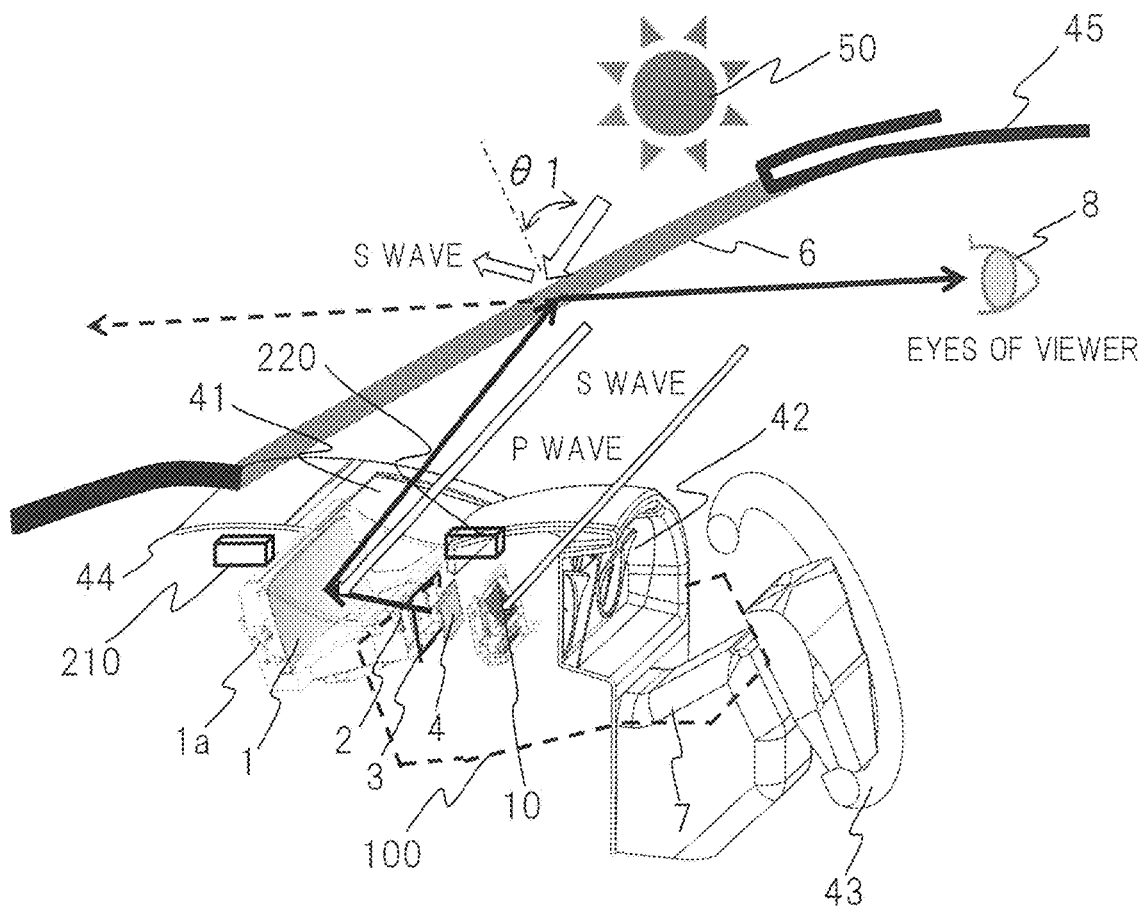
(B)
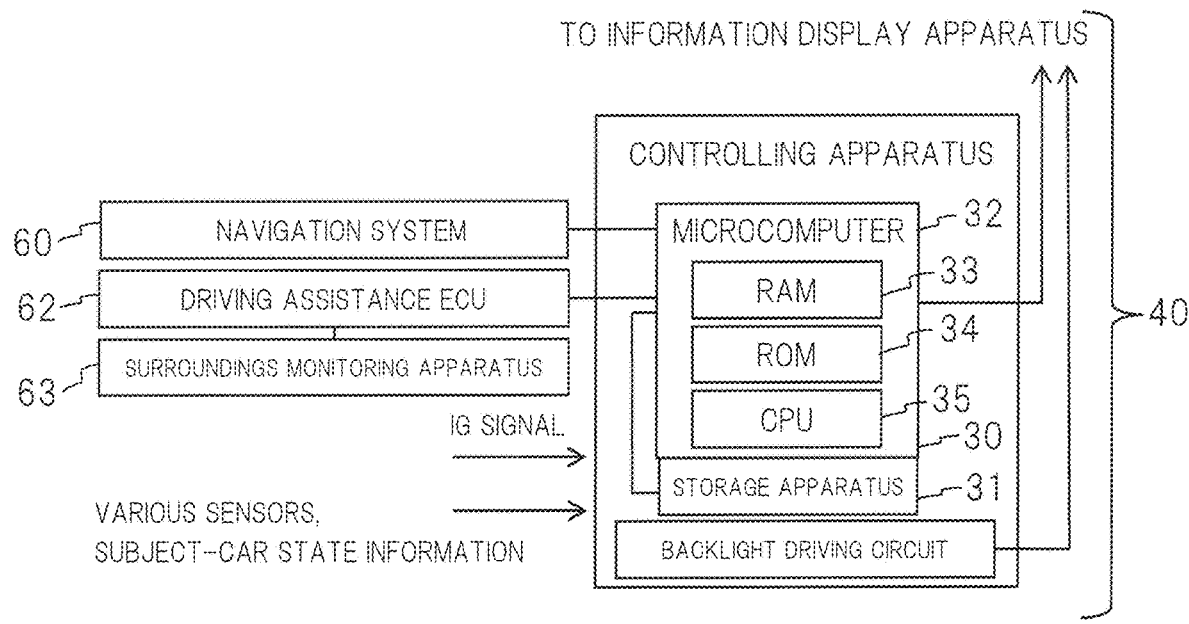

| | COLOR MIXTURE RATIO | | | BRIGHTNESS RATIO | CHROMATICITY | |
| --- | --- | --- | --- | --- | --- | --- |
| | B(460) | G(532) | R(635) | | x | y |
| SINGLE COLOR BASED ON LASER | 1 | 0 | 0 | 172 | 0.144 | 0.03 |
| | 0 | 1 | 0 | 2536 | 0.17 | 0.796 |
| | 0 | 0 | 1 | 623 | 0.714 | 0.286 |
| SINGLE COLOR BASED ON NTSC | 1 | 0 | 0 | — | 0.14 | 0.08 |
| | 0 | 1 | 0 | — | 0.21 | 0.71 |
| | 0 | 0 | 1 | — | 0.67 | 0.33 |
| EQUIVALENT COLOR BASED ON NTSC | 1 | 0.05 | 0 | 299 | 0.145 | 0.05 |
| | 0.05 | 1 | 0.1 | 2607 | 0.2 | 0.766 |
| | 0 | 0.05 | 1 | 750 | 0.677 | 0.321 |
| BRIGHTNESS-EMPHASIZED COLOR | 1 | 0.1 | 0.05 | 457 | 0.155 | 0.074 |
| | 0.025 | 1 | 0.2 | 2665 | 0.232 | 0.708 |
| | 0 | 0.1 | 1 | 877 | 0.644 | 0.351 |

| | COLOR MIXTURE RATIO | | | | | | BRIGHTNESS RATIO | CHROMATICITY | |
| --- | --- | --- | --- | --- | --- | --- | --- | --- | --- |
| | B1 (460) | B2 (450) | G1 (532) | G2 (515) | R1 (635) | R2 (645) | | x | y |
| SINGLE COLOR BASED ON LASER | 1 | 1 | 0 | 0 | 0 | 0 | 282 | 0.15 | 0.024 |
| | 0 | 0 | 1 | 1 | 0 | 0 | 4280 | 0.118 | 0.802 |
| | 0 | 0 | 0 | 0 | 1 | 1 | 1126 | 0.716 | 0.284 |
| SINGLE COLOR BASED ON NTSC | 1 | | 0 | | 0 | | — | 0.14 | 0.08 |
| | 0 | | 1 | | 0 | | — | 0.21 | 0.71 |
| | 0 | | 0 | | 1 | | — | 0.67 | 0.33 |
| EQUIVALENT COLOR BASED ON NTSC | 1 | 1 | 0.05 | 0.1 | 0 | 0 | 578 | 0.149 | 0.049 |
| | 0 | 0 | 1 | 1 | 0.1 | 0.5 | 4541 | 0.208 | 0.723 |
| | 0 | 0 | 0.05 | 0.1 | 1 | 1 | 1322 | 0.658 | 0.331 |
| BRIGHTNESS-EMPHASIZED COLOR | 1 | 1 | 0.05 | 0.1 | 0.05 | 0 | 704 | 0.153 | 0.056 |
| | 0 | 0 | 1 | 1 | 0.5 | 0.1 | 4632 | 0.23 | 0.704 |
| | 0 | 0 | 0.15 | 0.05 | 1 | 1 | 1489 | 0.637 | 0.354 |

INFORMATION DISPLAY APPARATUS

TECHNICAL FIELD

The present invention relates to an information display apparatus that projects images on a windshield glass of so-called vehicle such as a car, a train and an airplane, that moves while people are loaded therein.

BACKGROUND ART

So-called head-up-display (HUD) apparatus has been already known in, for example, the following Patent Document 1, the head-up-display apparatus creating virtual images by projecting image light onto a windshield glass of a car to display traffic information such as route information and traffic jam information and car information such as a fuel level and a coolant temperature.

Such a type of the information display apparatus is desirable to be downsized since the HUD apparatus itself is arranged between a windshield glass and a steering in front of a driver seat.

RELATED ART DOCUMENT

Patent Document

Patent Document 1: Japanese Patent Application Laid-Open Publication No. 2015-194707

SUMMARY OF THE INVENTION

Problems to be Solved by the Invention

In a principle of the virtual image creation using a concave mirror for achieving a head-up-display apparatus according to a related art, a virtual image using a concave mirror 1' is acquired by arranging object points A and B on portions that are inside a focal point "F" (focal length "f") from a point 0 on an optical axis of the concave mirror 1' as shown in FIG. 22. In FIG. 22, the concave mirror 1' is regarded as a convex lens having a similar positive refractive power for convenience of description, and a relation among the object points, the convex lens (described as the concave mirror in FIG. 20 for convenience of description) and the created virtual image is shown.

In a related art, in order to increase a size of the virtual image created by the concave mirror 1', it is better to bring the object points A and B to be close to the focal point F. However, in order to acquire a desirable magnification, a curvature radius of the concave mirror is reduced. As a result, the mirror size becomes small, and therefore, only a virtual image having a large magnifying power but a small viewable range is consequently practically acquired. Therefore, in order to satisfy both (1) the desirable virtual image size and (2) the necessary virtual-image magnification "M=b/a" at the same time, it is necessary to fit the concave mirror dimension with the viewable range, and to determine the virtual-image magnification balanced with the image display apparatus.

On the other hand, in the HUD of the virtual image mode disclosed in the Patent Document 1, in order to increase a dimension of the virtual image that can be viewed by a viewer, a volume of the apparatus increases because the concave mirror dimension creating the virtual mage is large.

In the Patent Document 1, an HUD that displays a virtual image of information such as so-called speed information is described, but so-called augmented reality is not taken into consideration, the augmented reality enlarging the virtual-image viewable range that can be visually recognized by the viewer, enlarging the virtual image size, and overlapping the virtual image with a practical image of a background view looked at by eyes of the viewer. In order to achieve the augmented reality, it is necessary to increase a distance from an image source to the concave mirror. And, when a case of overlap of the virtual image with a practical image of a foreground view is also taken into consideration, point-of-view motion becomes small and unnatural, and therefore, it is necessary to consider an image display apparatus capable of acquiring a lot of pieces of the image information while improving this unnaturalness.

Accordingly, a purpose of the present invention is to provide an image display apparatus capable of causing smoother (more natural) point-of-view motion of a viewer to reduce the motion and acquiring a lot of pieces of image information.

Means for Solving the Problems

The present invention has been made in consideration of the above-described background art and problem. As one example to be cited, in an information display apparatus displaying image information onto a vehicle, the information display apparatus includes a first information display apparatus and a second information display apparatus arranged between a windshield of the vehicle and an instrument panel of the vehicle, the instrument panel includes a direct-view type image display apparatus, the first information display apparatus includes a virtual-image optical system that displays a virtual image onto a forward part of the vehicle by causing the windshield glass to reflect light emitted from the image display apparatus displaying the image information, and the second information display apparatus includes a practical-image optical system that projects light to acquire a practical image overlapped with the virtual image created by the first information display apparatus.

Effects of the Invention

The above-described present invention can provide an information display apparatus reducing point-of-view motion of a driver to contribute to safety driving assistance by display combination among a HUD apparatus that overlaps a virtual image with a background view, a practical-image display apparatus that displays a practical image overlapped with a foreground view, and an instrument panel.

BRIEF DESCRIPTIONS OF THE DRAWINGS

FIG. 1 is a schematic configuration diagram of an information display apparatus and peripheral apparatuses of the information display apparatus in a first working example;

BEST MODE FOR CARRYING OUT THE INVENTION

Figure 2:
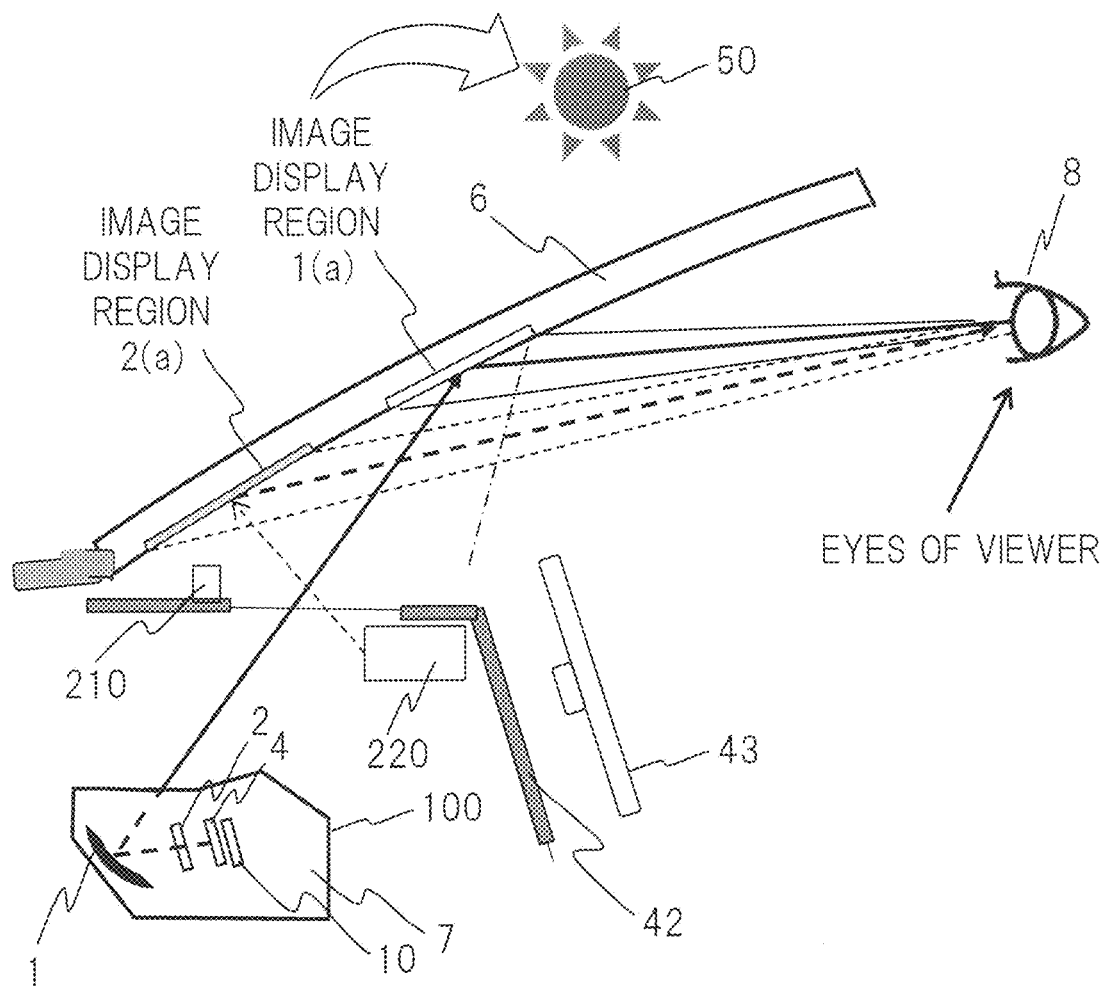
FIG. 2 is a schematic cross-sectional configuration diagram showing the information display apparatus, a windshield glass and a point-of-view position of a driver in a working example.

Hereinafter, working examples of the present invention will be described in detail with reference to drawings and others.

First Working Example

FIG. 1 is a schematic configuration diagram of an information display apparatus and peripheral apparatuses of the information display apparatus in a first working example. Here, as one example, an information display apparatus that projects images onto a windshield glass of a car will be particularly described. FIG. 1 (A) is a cross-sectional perspective view of the information display apparatus, and FIG. 1 (B) is a schematic configurational block diagram of peripheral apparatuses.

FIG. 1 (A) is a conceptual diagram of a vertical cross section of a vehicle body in which "45" indicates a vehicle body while "6" indicates a windshield glass that is a projection-receiving member. A HUD apparatus 100 is an apparatus that creates a virtual image on a forward part of a subject vehicle on a line of sight 8 of a driver, and therefore, displays various types of information reflected on the projection-receiving member 6 (an inner surface of the windshield glass in the present working example) as a virtual image. Note that the projection member 6 may be any member as long as the member is a member on which the information is projected, and not only the above-described windshield glass but also a combiner may be applicable. That is, the HUD apparatus 100 of the present working example may be any apparatus as long as the apparatus creates a virtual image on the forward part of the subject vehicle on the line of sight 8 of the driver and makes the driver visually recognize the virtual image. The information to be displayed as the virtual image also includes, for example, vehicle information and information of foreground scenery, an image of which is captured by a monitor camera or a camera (not illustrated) such as an around viewer camera.

The HUD apparatus 100 includes a controlling apparatus 40 that controls an image display apparatus 4 and a backlight source 10. Note that optical components including the image display apparatus 4, the backlight source 10 and others configure a virtual-image optical system described below, and include a concave mirror 1 having a concave shape that reflects the light. The light that has been reflected on this concave mirror 1 is reflected on the windshield glass 6 and goes to the line of sight 8 (that may be so-called Eyebox that is a driver's correctly-viewable point-of-view range) of the driver.

Subsequently, in FIG. 1 (B), the controlling apparatus 40 acquires, from the navigation system 60, various types of information such as a speed limit and the number of lanes of a road corresponding to a current position at which the subject vehicle is running, a travelling-scheduled route of the subject vehicle set in a navigation system 60 or others, and displays the information as foreground-scenery information (that is information displayed as the virtual image on the forward part of the subject vehicle).

A driving assistance ECU 62 is a controlling apparatus that achieves driving assistance control by controlling a driving system and a control system in accordance with obstacles detected as a result of monitoring performed by a surrounding monitoring apparatus 63. The driving assistance control includes publicly-known techniques such as a cruise control system, an adaptive cruise control system, a pre-crash safety system and a lane keeping assist system.

The surrounding monitoring apparatus 63 is an apparatus that monitors a surrounding state of the subject vehicle, and is, as one example, a camera that detects an object existing in surroundings of the subject vehicle on the basis of an image acquired by capturing an image of the surroundings of the subject vehicle, an exploration apparatus that detects an object existing in surroundings of the subject vehicle on the basis of a result of transmission/reception of exploration waves, and others.

As the foreground-scenery information, the controlling apparatus 40 acquires the information (such as a distance to a vehicle running ahead, a direction of the vehicle running ahead, positions of obstacles and traffic signs and others) from such a driving assistance ECU 62. Further, to the controlling apparatus 40, an ignition (IG) signal and subject-vehicle state information are input. The "subject-vehicle state information" of such information is information acquired as the vehicle information, and includes alert information showing, for example, occurrence of a predetermined abnormal state of a fuel level of an internal combustion engine, a coolant temperature or others. And, the information also includes an operational result of a turn signal and a running speed of the subject vehicle, and besides, shift-lever position information and others.

An image signal from the controlling apparatus 40 described above is the image information corresponding to the state and the ambient surroundings of the car, and is selectively suitably displayed by the HUD apparatus 100 that is the first information display apparatus for use in overlapping the virtual image with the background practical view viewed by the viewer, displayed by the projection optical apparatus 220 that is the second information display apparatus for use in overlapping the practical image with the foreground view, and displayed by the direct-view type instrument panel 42 that is the third information display apparatus. According to the present invention, this manner causes the smoother (more natural) point-of-view motion performed during the driving by the driver who is the viewer, so that the burden on the driver is reduced. Note that this controlling apparatus 40 is activated by the input of the ignition signal. The configuration of the entire system of the information display apparatus according to the present working example has been described above.

The HUD apparatus 100 is provided with the image display apparatus 4 that projects the image light for use in displaying the information and provided with the lenses 2 and 3 between the image display apparatus 4 and the concave mirror 1, the lenses being the correcting optical elements for use in correcting distortion and aberration caused when the virtual image is formed by the concave mirror 1 using the image displayed on this image display apparatus 4.

As the above-described image display apparatus 9, for example, note that not only an LCD (Liquid Crystal Display) having a backlight but also a self-luminescent VFD (Vacuum Fluorescent Display) and others are cited.

Meanwhile, the image may be displayed on a screen by a projection apparatus in place of the above-described image display apparatus 4, be created as the virtual image by the above-described concave mirror 1, be reflected by the windshield glass 6 that is the projection-receiving member, and be headed to the point of view 8 of the driver 8. Such a screen may be made of, for example, a micro lens array obtained by two-dimensionally arranging micro lenses.

More specifically, in order to reduce the distortion of the virtual image, a shape of the concave mirror 1 may have a relatively small curvature radius so as to increase a magnification power in an upper side shown in FIG. 1 (A) (the upper side is a region that reflects the light rays on a lower portion of the windshield glass 6 having a relatively short distance to the point of view of the driver) but have a relatively large curvature radius so as to decrease the magnification power in a lower side thereof (the lower side is a region that reflects the light rays on an upper portion of the windshield glass 6 having a relatively long distance to the point of view of the driver). Alternatively, more favorable correction is also achieved by tilting the image display apparatus 4 from the optical axis of the concave mirror to correct the difference in the virtual-image magnification, which results in the reduction in the distortion itself.

FIG. 2 is a schematic cross-sectional configuration diagram showing the information display apparatus, the windshield glass and a point-of-view position of the driver in the present working example.

Figure 3:
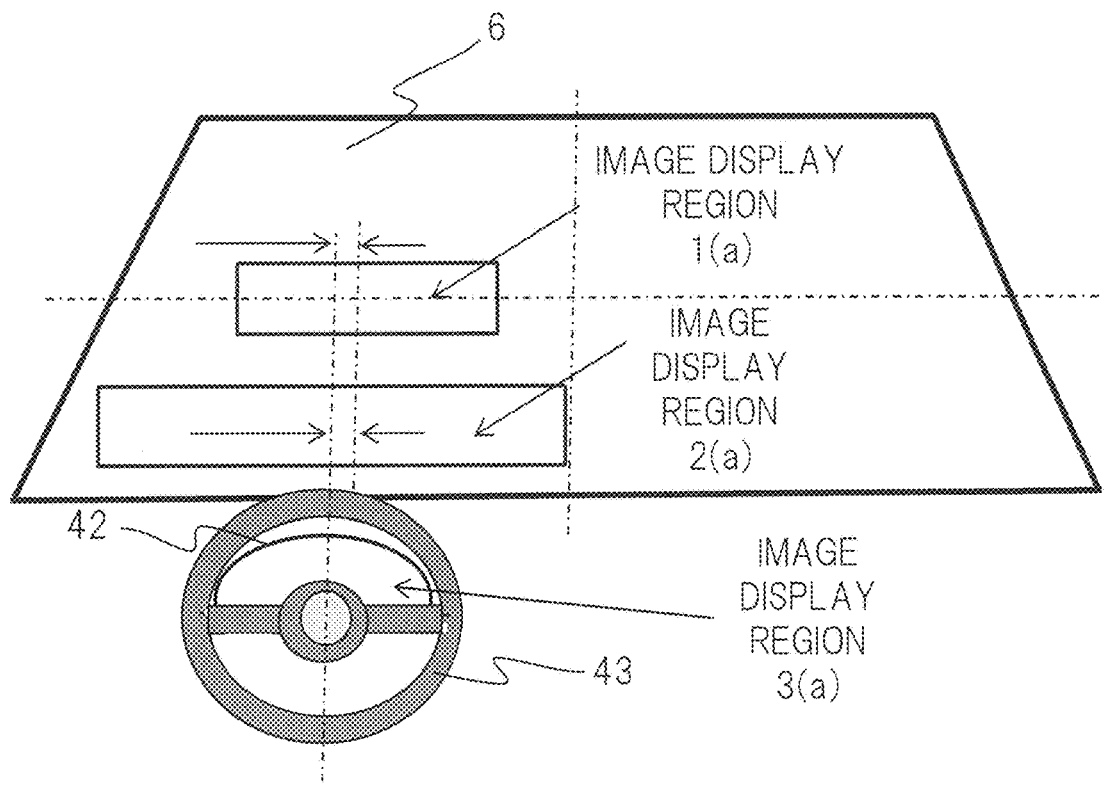
FIG. 3 is a schematic explanatory diagram of an image display position in a working example.

FIG. 3 is a schematic explanatory diagram of an image display position in the present working example. Note that FIG. 3 is a schematic diagram in a case that the windshield glass 6 is looked at from the driver seat.

As shown in FIGS. 2 and 3, the present working example includes an image display region 1 (*a*) near a center of the windshield glass 6 that is a forward surface of the steering 43, an image display region 2 (*a*) on the lower portion of the windshield glass 6 and an image display region 3(*a*) over the instrument panel 42.

The information display apparatus in the present working example can suppress the point-of-view motion by causing the above-described HUD apparatus 100 to provide the viewer with a virtual image having a virtual-image distance of 8 m and a size that is equal to or larger than 90 inches while using, as a reflection surface, a portion near the center of the windshield glass 6, that is, the image display region 1(*a*) shown in FIGS. 2 and 3 so that the virtual image is overlapped with the practical scenery that is being looked at by the driver during the driving.

Further, the inventors have measured change of the point-of-view position of the driver during the driving in town, and have found that, through a practical measurement, 90% of the point-of-view motion is suppressed when the maximum value of the virtual-image distance is 30 m. Also, during a high-speed driving, it has been found that, through an experiment, the point-of-view motion can be similarly suppressed when the virtual-image distance is set to be equal to or larger than 70 m. In this case, a necessary virtual-image size is equivalent to 350 inches.

On the basis of the above description, in the present invention, the HUD apparatus 100 displaying the virtual image is used to display this virtual image in the image display region 1 (*a*) shown in FIGS. 2 and 3 for a background region on which the point of view of the viewer is put, but to overlap the image (practical image) with the foreground view that is practically looked at by the driver who is the viewer in the image display region 2(*a*) shown in FIGS. 2 and 3. Therefore, as one example, the practical image is projected on the lower portion of the windshield glass by using the projection optical apparatus 220 that causes the MEMS (Micro Electro Mechanical Systems) elements to perform the scan with a light flux having a specific polarized wave. In this case, the image display using the MEMS is advantageous for the projection onto the windshield glass 6 having a curvature because this image display is basically performed in focus free.

Note that a member having a property of a reflectance against the specific polarized wave described in detail later, the reflectance being different from that against other polarized wave, is contained in the lower portion of the windshield glass on which the image is projected, or the member is applied, adhered or pasted on a glass surface inside the car, so that the image light is effectively reflected so as to orient the practical image to the viewer. In this case, a horizontal display dimension of this image in the image display region 1(*a*) on the windshield glass 6 created by the HUD apparatus 100 is smaller than a horizontal display dimension of the practical image displayed by the projection optical apparatus 220 because the image light is focused to create the virtual image on a background part in front of the windshield glass.

Figure 4:
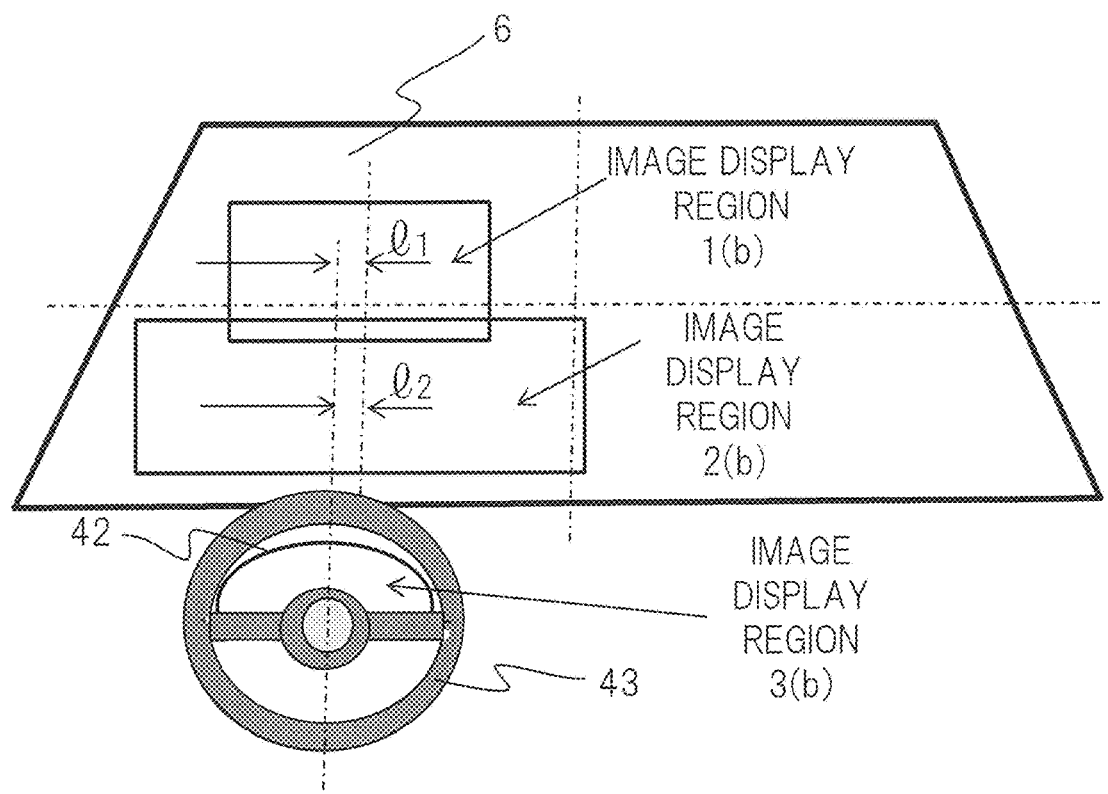
FIG. 4 is a schematic explanatory diagram of another image display position in a working example.

And, through an experiment, it has been verified that three-dimensional virtual display is achieved by overlapping an image display region 2(*b*) where the image is overlapped with the foreground view and a part or entire of a background-image display region 1(*b*) where the virtual image is displayed by using the HUD apparatus as shown in FIG. 4 in place of the above-described division of the image display regions. In order to achieve more favorable display, it is preferable to partially overlap a display position of the virtual image in a deep direction and a display position of the practical image in the deep direction, and a more favorable effect has been obtained. And, continuity of the displayed image has been obtained by the overlap display of the two image display regions, so that a new effect such as the smoothed point-of-view motion has been also obtained.

A display position, a display color and a display pitch of the virtual image projected on the above-described portion near the center of the windshield glass are preferable to be suitably selected by a viewing camera 210 for use in viewing a state of the viewer. As one example, it is preferable not only to perform an image display of information indicating a next operation of a car controlled in an autonomous driving state, such as turning right/left, stoppage or acceleration, but also to perform an image display for attention seeking by using information acquired by sensing a health state of the driver, sleepiness of the same or others. Note that it is unnecessary to always display such information, and it is desirable to follow a motion of a line of eyes of the driver by using the viewing camera 210 and display the information at a necessary part if needed.

Figure 5:
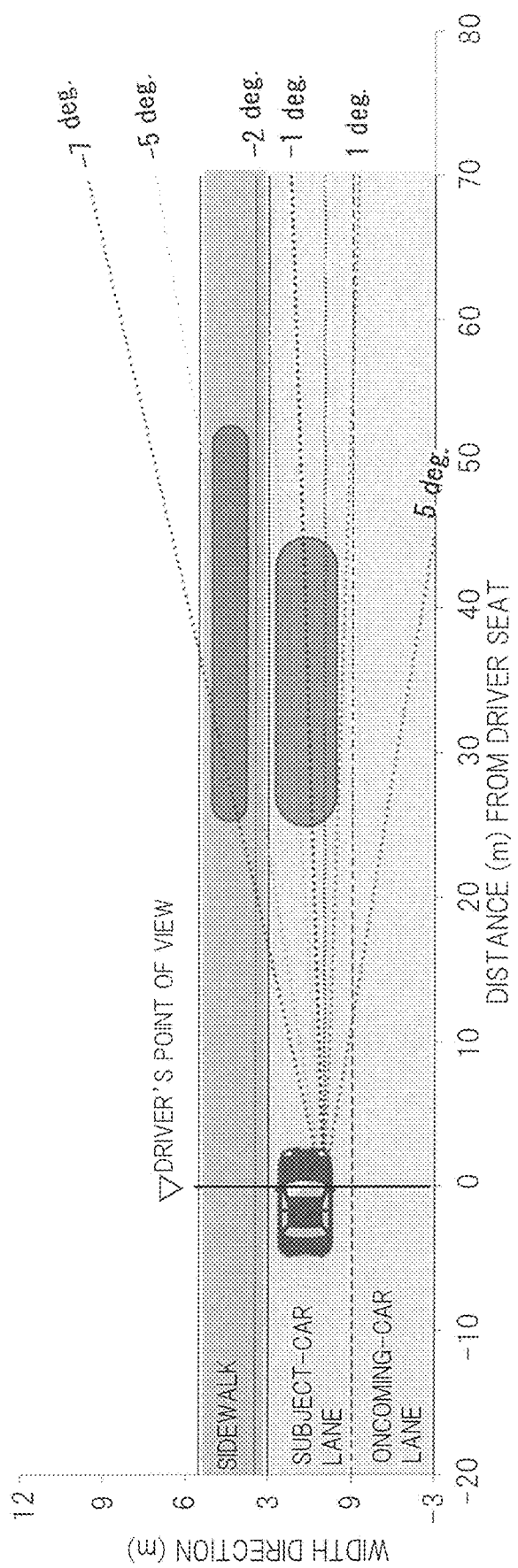
FIG. 5 is a diagram for explaining an angle of a driver's attentive-look point in driving and an object.
Figure 6:
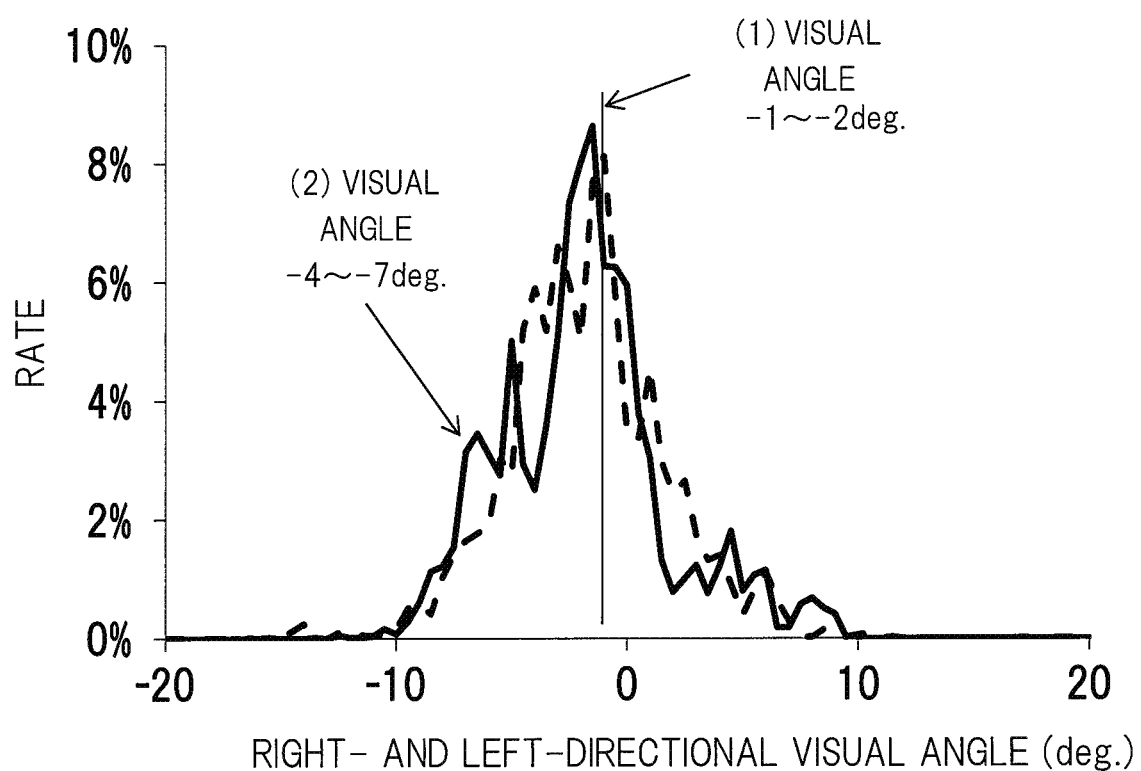
FIG. 6 is an angle property of a point of view of a driver in driving.

In addition, through an experiment, the inventors have obtained a position at which the driver attentively looks during the driving at a low speed of about 40 km per hour on a domestic regular road having each one lane for one direction as shown in FIG. 5. A result of this experiment is shown in FIG. 6. Note that the drawing shows a result of investigation on the point-of-view motions of two examinees having different driving experience from each other. As a result, it has been found that the driver having a long driving experience drove the car while being extremely conscious of a pedestrian on a sidewalk during the driving as shown with a solid line, and it has been more specifically found that this driver had the attentive look in a range from −4 degrees to −7 degrees with reference to an exact front side (having a visual angle of 0 degree).

On the other hand, the driver having a short driving experience had a narrow range of the visual angle in right and left directions as shown with a dashed line, and mostly attentively looked at a position in a range from −1 degree to −2 degrees with reference to the exact front side. Similarly, it has been found that the driver having the long driving experience shown with the solid line also had an attentive-look point that peaks in a range from −2 degrees to −3 degrees, and it has been found that the driver was driving the car while being conscious of a part slightly closer to a left side, that is, the sidewalk, than a part in the driving with the looking at the exact front side.

The maximum attentive-look point of a driver who drives a right-hand car that runs on a left lane is positioned at the sidewalk where the pedestrian walks, that is, at a portion slightly closer to the left side than the exact front side. Similarly, the maximum attentive-look point of a driver who drives a left-hand car that runs on a right lane is positioned at the sidewalk where the pedestrian walks, that is, at a portion slightly closer to the right side than the exact front side.

It has been also found that the maximum attentive-look point is brought closer to the exact front side by increase in the driving speed of the car. Therefore, it has been found that it is essential to change the display position (display range) of the image (that is, to display the image so as to be closer to the sidewalk where the pedestrian walks) in accordance with the driving speed for improving the visual recognition.

Figure 7:
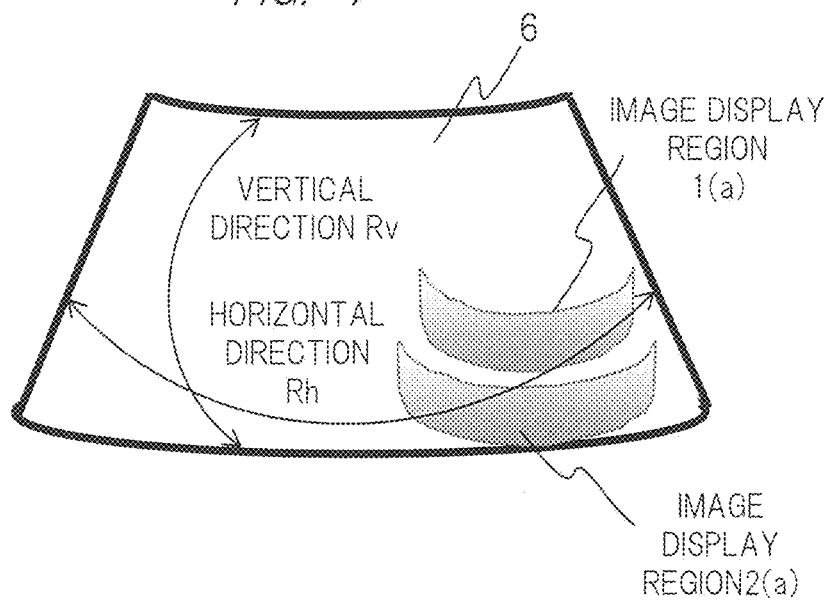
FIG. 7 is a diagram for explaining difference in a curvature radius of a windshield glass in a working example.

As shown in FIG. 7, the windshield glass 6 of the car has a curvature radius "Rv" in a vertical direction and a curvature radius "Rh" in a horizontal direction that are different from each other, and a relation of "Rh>Rv" is generally established. Therefore, as shown in FIG. 7, when the windshield glass 6 is regarded as the reflection surface, the windshield glass 6 becomes a toroidal surface of the concave mirror. Therefore, in the HUD apparatus 100 of the present working example, the shape of the concave mirror 1 may have an average curvature radius that is different between the horizontal direction and the vertical direction so as to correct a virtual-image magnification depending on the shape of the windshield glass 6, that is, correct the difference in the curvature radius between the vertical direction and the horizontal direction of the windshield glass. In this case, the shape of the concave mirror 1 as a spherical or aspherical shape (expressed by an expression (2) below) that is symmetrical across the optical axis is expressed by a function of a distance "h" from the optical axis, and a horizontal cross-sectional shape and a vertical cross-sectional shape of each of distant regions cannot be individually controlled, and therefore, the shape is preferably corrected so as to follow a function of plane coordinates (x, y) from the optical axis of the mirror surface so as to be a free curved surface expressed by an expression (1) described below.

[Numerical Expression 1]

$$Z = \frac{c \cdot (x^2 + y^2)}{1 + \sqrt{1 - (1+K)c^2 \cdot (x^2 + y^2)}} + \Sigma\Sigma(Cj(m, n) \times x^m \times y^n) \quad (1)$$

[Numerical Expression 2]

$$Z = \frac{c \cdot h^2}{1 + \sqrt{1 - (1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20} \quad (2)$$

In this case, a symbol "z" is a sag amount on the coordinates (x, y) with reference to axes defining a plane, a symbol "c" is a curvature on an origin of the axes defining the plane, a symbol "K" is a conic constant, and a symbol "Cj" is a coefficient.

Return to FIG. 1 again. For example, the lens element 2 and the lens element 3 are further arranged as transmissive optical components between the image display apparatus 4 and the concave mirror 1 to control an emission direction of the optical ray to the concave mirror, so that distortion is corrected in accordance with the shape of the concave mirror, and besides, virtual-image aberration including astigmatism caused by the above-described difference between the curvature radius in the horizontal direction and the curvature radius in the vertical direction of the windshield glass 6 is corrected.

Figure 8:
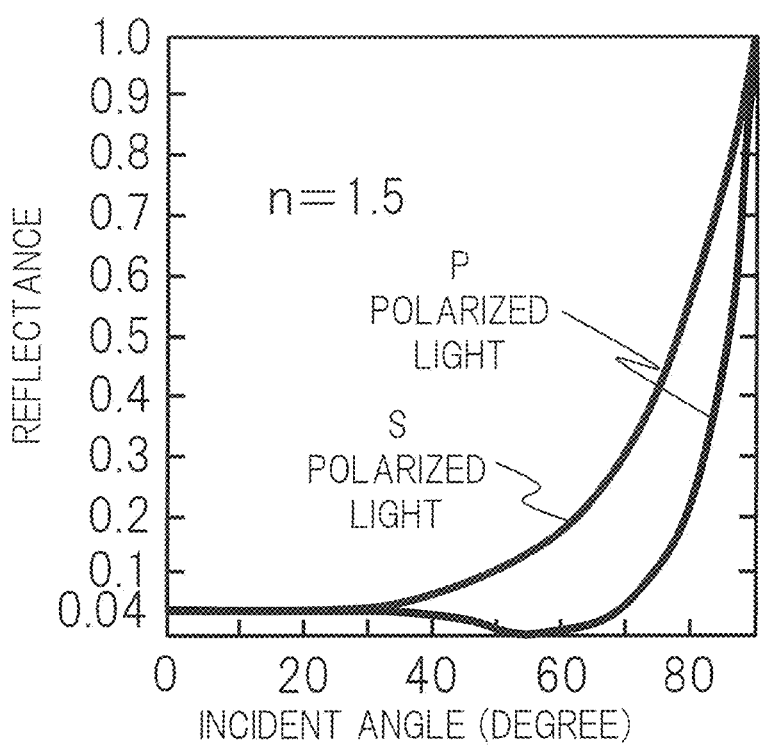
FIG. 8 is reflectance properties against different polarized light at an incident angle on a glass in a working example.

Meanwhile, as shown in FIGS. 1 and 2, most of S-polarized waves of the light flux from the sun 50 are reflected on the windshield glass while most of components of the light flux entering the car are P-polarized waves. Therefore, in order to project the image on the lower portion of the windshield glass for overlapping the image with the foreground view, the projection optical apparatus 220 that allows the S-polarized light flux to enter the MEMS element for the scan is used. In this case, another reason why the S-polarized waves are used for the image display is that, since a tilt angle of the windshield glass is equal to or larger than 40 degrees that is large, the S-polarized waves each has a high reflectance at this angle as shown in FIG. 8.

Figure 9:
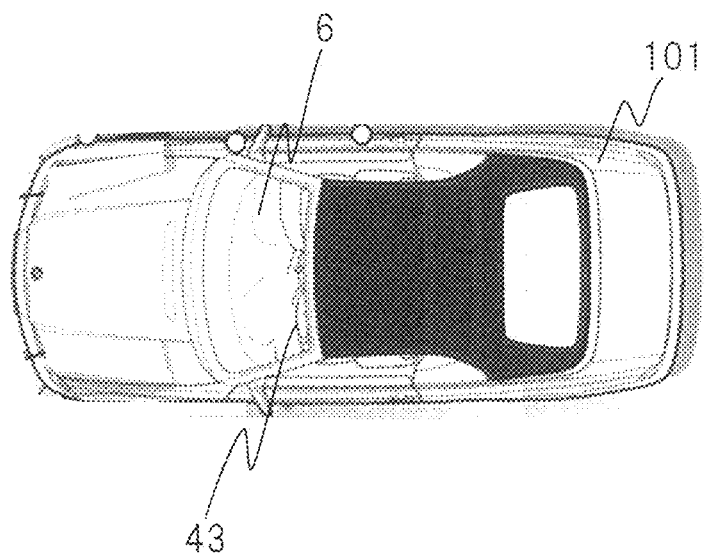
FIG. 9 is a top view of a car mounting an information display apparatus in a working example.

Further, another reasons are that the windshield glass of the car has the curvature radius Rh in the horizontal direction and the curvature radius Rv in the vertical direction that are different from each other as shown in FIG. 7 and that the center of the image is different from the position of the driver who is the viewer (a position of the steering 43 in FIG. 9) as shown in FIG. 9 across the center of the curvature in the horizontal direction.

Figure 10:
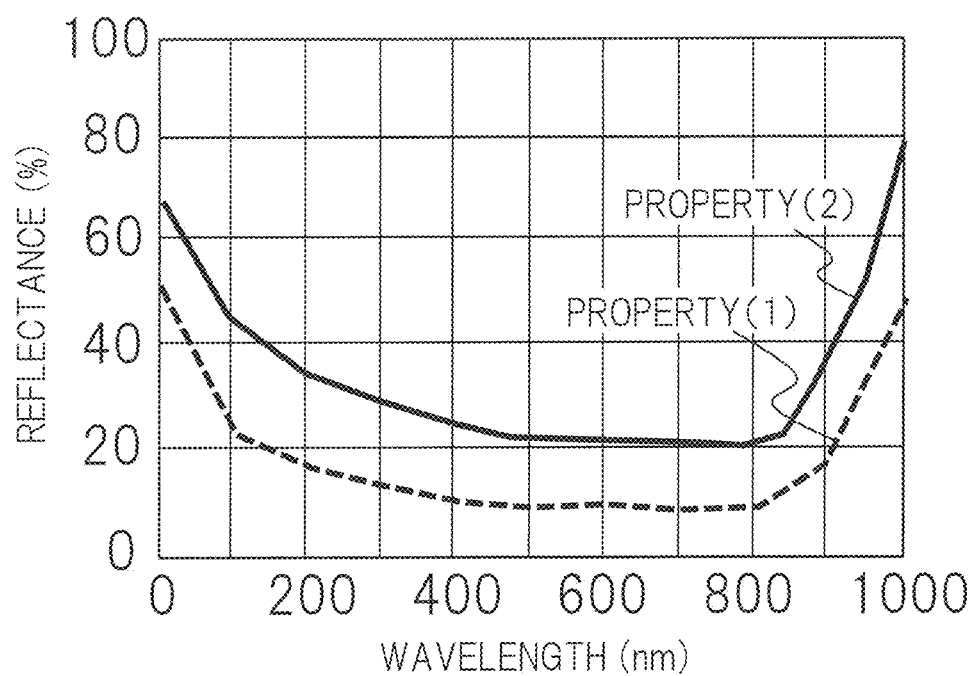
FIG. 10 is a characteristic diagram showing a reflectance property of a reflective material that is applied, adhered or pasted on a windshield glass in a working example.

On the other hand, the above-described projection optical apparatus 220 projects the image onto the windshield glass by allowing the MEMS to perform the scanning in the vertical and horizontal directions while using a laser light source, and a member having a property that has a reflectance against the S-polarized waves different from a reflectance against the P-polarized waves is contained in the image display region 2 (*a*) on the lower portion of the windshield glass shown in FIGS. 2 and 3, or the member is applied, adhered or pasted on the glass surface inside the car, so that the image light is effectively reflected to orient the practical image to the viewer. More specifically, as a reflectance against the S-polarized laser light in a visible-light range (380 nm to 780 nm), a reflectance from about 10% shown as a property (1) to about 20% shown as a property (2) on average is favorable as shown in FIG. 10, so that the image light is reflected on the reflection surface of the windshield glass in contact with a room inside, and heads toward the driver who is the viewer.

More specifically, the same effect may be provided by using a sheet obtained by laminating optical multi-layer films having the above-described properties or laminating a plurality of sheets having different refractive indexes from one another, or surface asperity may be formed on a sheet surface in order to cause a larger diffusion property in the horizontal direction of the windshield glass than a diffusion property in the vertical direction of the same.

Setting the above-described sheet reflectance to be high in an ultraviolet region (shorter than 380 nm) and a near-infrared region (longer than 780 nm) leads to suppression of entrance of ultraviolet rays and near-infrared rays into the car for achieving more comfortable circumstances.

As described above, the present working example relates to an information display apparatus that displays information onto a vehicle, and the information display apparatus is configured so that the information display apparatus includes the first information display apparatus that causes light reflected on the windshield glass of the vehicle to display image information of the virtual image, the second information display apparatus that allows the MEMS element to scan the windshield glass with the laser light to acquire the practical image, and the third information display apparatus that uses the instrument panel of the vehicle, so that the first information display apparatus includes the virtual-image optical system that displays the virtual image onto the forward part of the vehicle by causing the windshield glass to reflect the light emitted from the image display apparatus displaying the image information, so that the second information display apparatus includes the practical-image optical system that displays the practical image onto the windshield glass by causing the scanning-type mirror element to perform the scanning with the laser light, so that the third information display apparatus includes the direct-type image display apparatus as the instrument panel, and so that the image display position of the first information display apparatus is set to the portion near the center of the windshield glass while the image display position of the second information display apparatus is set to the lower portion of the windshield glass.

In this manner, the information display apparatus that reduces the unnaturalness of the point-of-view motion of the driver to contribute to the safety driving assistance can be provided by the display combination among the HUD apparatus that overlaps the virtual image with the background view, the practical-image display apparatus that displays the practical image overlapped with the foreground view, and the instrument panel. Particularly, when the practical image created by the practical-image display apparatus is displayed on the foreground view between the display of the instrument panel on the near side of the driver and the virtual image overlapped and displayed with the background view created by the HUD apparatus, the point-of-view motion of the driver can be smoothly moved from the near side (instrument panel) to the foreground view (practical-image display), and besides, from the foreground view to the background view display (virtual-image display).

<Specific Configuration of HUD Apparatus>

A more specific optical configuration of the HUD apparatus including the virtual-image optical system of the information display apparatus will be described below.

Figure 11:
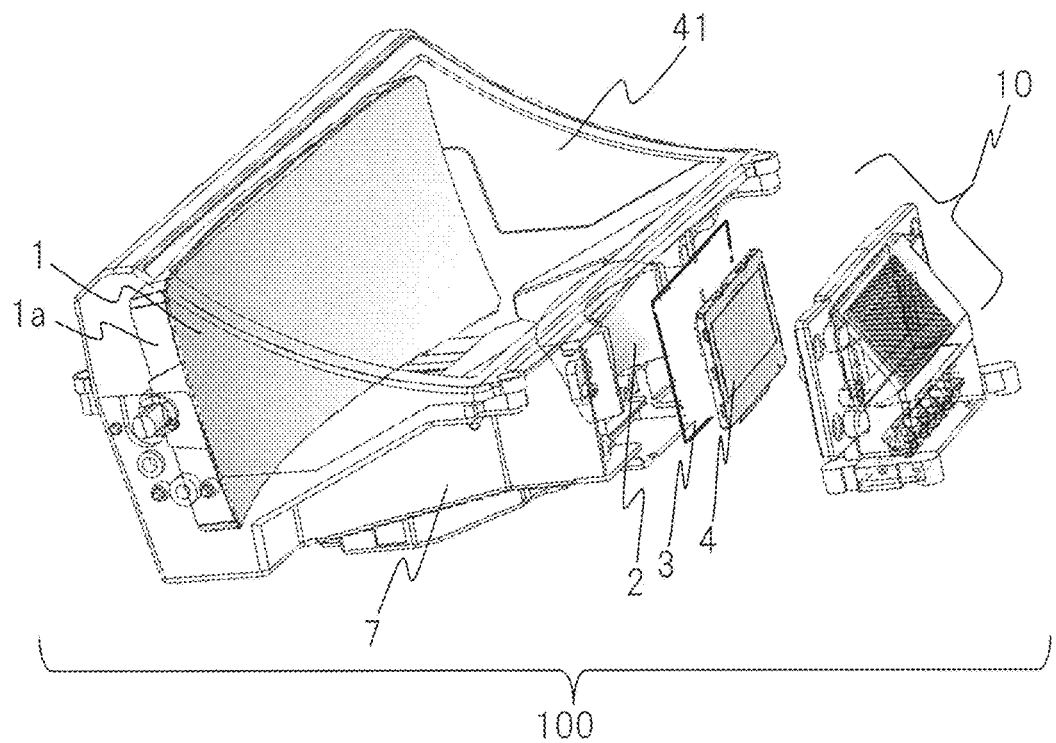
FIG. 11 is a schematic configuration diagram of a virtual-image optical system of an information display apparatus in a working example.

FIG. 11 is an entire configuration diagram of the HUD apparatus 100 in the present working example. As described above in FIG. 9, the concave (free-curved) mirror 1 that projects the image light for use in forming the virtual image through the windshield glass 6, the correction lens group 2 for use in correcting the distortion and the aberration caused in the projection, the image display apparatus 4, and the backlight source 10 configuring the backlight are provided in an order from a downstream side. Note that a numerical symbol "7" indicates a housing. Further, in order to suppress the P-wave components of the sunlight entering the HUD apparatus 100, an optical means 3 for use in suppressing the P-wave components are provided as one example between the lens group 2 and the image display apparatus 4.

First, in the present configuration, the concave (free-curved) mirror 1 that projects the image light preferably has a function of reflecting the visible light (wavelength: about 400 to 700 nm), and besides, particularly removing, for example, the infrared rays (IR), the ultraviolet rays (UV) and others, that are unnecessary for the information display apparatus and damage on the apparatus, from the sunlight containing various wavelength spectra. In this case, when the reflectance of the visible light is set to be equal to or higher than 95%, a virtual-image optical system having a high light use efficiency is achieved.

However, on the other hand, a case of direct looking at the concave (free-curved) mirror 1 through the windshield glass reduces dignity of the car since external light is reflected to cause bright view, reduces an image quality such as a contrast performance of the image (virtual image) acquired in the information display apparatus since intensive light such as the sunlight or a headlight of an oncoming car at night is reflected on the concave mirror 1 so that a part of the light rays returns to a liquid crystal panel, and damages a polarization plate and the liquid crystal panel configuring the image display apparatus 4. Therefore, when the reflectance of the concave (free-curved) mirror 1 is purposely reduced to be equal to or lower than 90%, more preferably, equal to or lower than 85%, the above-described problems can be solved.

As a concave mirror supporting portion 1*a* that is abase member of the concave (free-curved) mirror 1, a high-transparent member is selected in order not to allow the base member to absorb the above-described light having the non-reflected wave-length component of the sunlight. As a plastic-made high-transparent member, (1) ZEONEX produced by Zeon corporation, (2) polycarbonate, (3) acrylic resin and others are cited. The (1) ZEONEX having a moisture absorption rate of almost 0% and a high thermal deformation temperature is suitable but expensive, and therefore, it is preferable to use a devised polycarbonate having the similar thermal deformation temperature and a moisture absorption rate of about 0.2%. The acrylic resin having the highest formability and being inexpensive has the highest moisture absorption rate, and therefore, it is essential to arrange a moisture proof film and a reflection film.

In order to prevent the moisture absorption of the base member of the concave (free-curved) mirror 1, in accordance with the reflection film formed on the reflection surface, the moisture proof film may be arranged on an opposite surface by depositing SiN (silicon nitride) thereon as the moisture proof film. Since the SiN film that is the moisture proof film transmits the sunlight, the light absorption on the base member does not occur, so that the thermal deformation can be suppressed. As a result, the shape change of the concave (free-curved) mirror made of the polycarbonate or the acrylic resin due to the moisture absorption can be also prevented.

Further, although not illustrated here, a light-transmitting plate having a function of removing the IR and the UV may be arranged on an opening 41 formed above the HUD apparatus 100 in addition to or in place of the concave (free-curved) mirror 1 having the function of suppressing/removing the IR and the UV. In this case, note that the prevention of external dusts from entering the HUD apparatus 100 can be achieved in addition to the provision of the IR- and UV-suppression function.

As described above, by the concave (free-curved) mirror 1, the unnecessary components of the sunlight having a lot of spectrum components entering the HUD apparatus 100 through the opening 41 can be removed in the HUD apparatus 100, and the visible-light component thereof can be mainly selectively extracted.

Meanwhile, as a factor reducing the image quality of the HUD apparatus, it is known that the image quality is reduced since the image light rays emitted from the image display apparatus 4 toward the concave mirror 1 is reflected on a surface of the optical element 2 arranged in the middle, and then, returns to the image display apparatus, is reflected again, and is overlapped with the original image light. Therefore, in the present working example, it is preferable not only to suppress the reflection by depositing a reflection preventing film on the surface of the optical element 2 but also to design a limited lens surface shape of either one or both of image-light incident surface and exit surface of the optical element 2 so that the above-described reflection light is avoided from extremely collecting on only one part of the image display apparatus 4.

Next, when a liquid crystal panel having a polarizing plate arranged in order to absorb the reflection light emitted from the optical element 2 is used as the image display apparatus 4, the reduction in the image quality can be suppressed. A backlight source 10 of the liquid crystal panel is controlled to orient an incident direction of the light entering the image display apparatus 9 so that the light efficiently enters an entrance pupil of the concave mirror 1. Further, a solid-state light source having a long product lifetime may be adopted as the light source, and besides, the polarized-light conversion is preferably performed by using a PBS (Polarizing Beam Splitter) in which an optical means for reducing a divergence angle of the light is provided as an LED (Light Emitting Diode) having small light output change against variation in an ambient temperature.

The polarizing plate is arranged at a position closer to the backlight source 10 (the light incident surface) and a position closer to the optical element 2 (the light exit surface) in the liquid crystal panel to increase a contrast ratio of the image light. When an iodine-based material having a high polarization degree is used for the polarizing plate at the position closer to the backlight source 10 (the light incident surface), a high contrast ratio can be obtained. On the other hand, when a dye-based polarizing plate is used at the position closer to the optical element 2 (the light exit surface), high reliability can be obtained even if the external light enters or even if the ambient temperature is high.

In the case of the usage of the liquid crystal panel as the image display apparatus 4, particularly when the driver wears polarized sunglasses, a specific polarized wave is blocked, and failure of an image to be visible occurs. In order to prevent this, it is preferable to arrange a λ/4 plate at a position closer to the optical element of the polarizing plate arranged at the position closer to the optical element 2 of the liquid crystal panel so as to convert the image light unified in a specific polarizing direction into circular polarized light.

<Specific Configuration of Projection Optical Apparatus>

Subsequently, a more specific optical configuration of the projection optical apparatus having the practical-image optical system of the information display apparatus will be described below.

Figure 12:
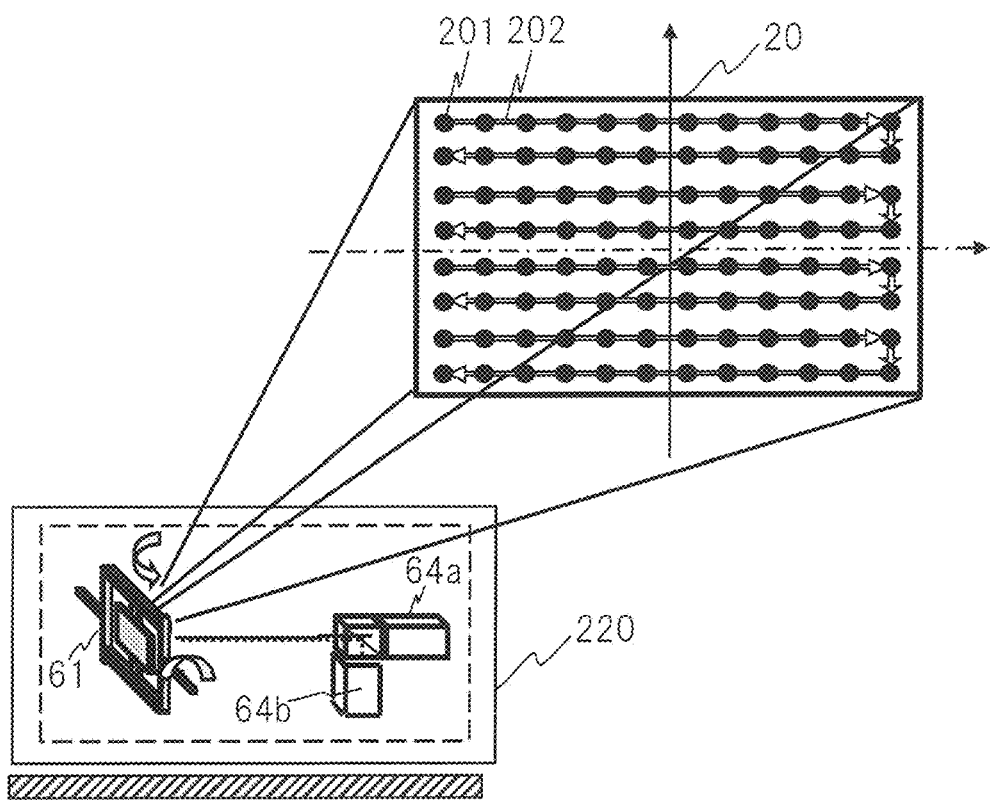
FIG. 12 is a basic configuration diagram of a projection optical apparatus in a working example.

FIG. 12 is a basic configuration diagram of a projection optical apparatus 220 that acquires the practical image by causing the MEMS to perform the scanning with the laser light in the present working example. In FIG. 12, the projection optical apparatus 220 is a scanning-type image display apparatus that mounts an optical scanning apparatus performing scanning in a two-dimensional direction with the laser light having been modulated in a light intensity (referred to as "modulated" below) in accordance with the image signal, and that causes this optical scanning apparatus to scan an irradiation-receiving body (such as the windshield glass) with the laser light to portray the image. That is, when the laser light from a light source unit 64 (64a, 64b) is reflected by a scanning mirror 61 having a rotational axis, the scanning with the laser light can be performed. Conceptually, modulated pixels 201 are two-dimensionally scanned on an image plane along a laser-light scan track 202 of a display surface 20.

Details of a two-dimensional polarizing function of the scanning mirror 61 in the present configuration example will be described below.

Figure 13:
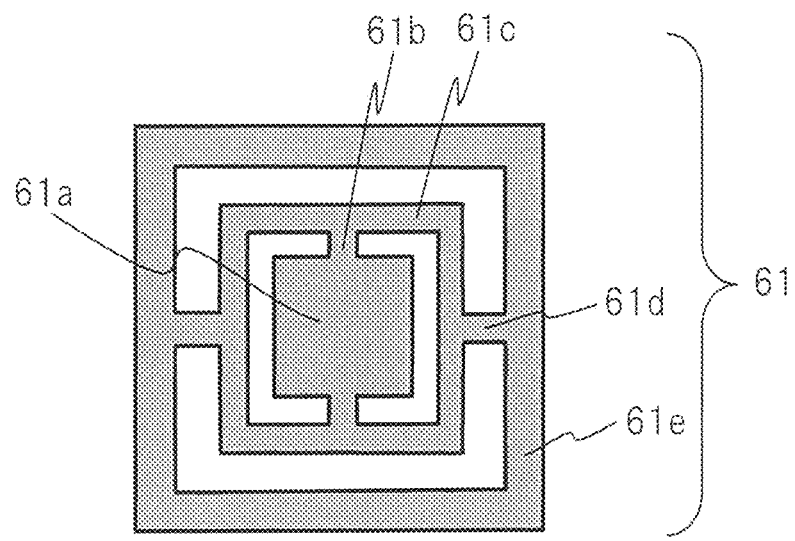
FIG. 13 is a schematic configuration diagram of a bi-axial MEMS element in a working example.

FIG. 13 is a schematic configuration diagram of the scanning mirror 61 that is a biaxial-driving MEMS element in the present configuration example. In FIG. 13, a scanning mirror surface 61a that polarizes the laser light at a reflection angle is connected to parts of a first torsion spring 61b that are coaxially opposed to each other so as to sandwich the scanning mirror surface 61a therebetween. Further, the first torsion spring 61b is connected to a supporting member 61c, and the supporting member 61c is connected to a second torsion spring 61d. The second torsion spring 61d is connected to a frame 61e. And, although not illustrated, a permanent magnet and a coil are arranged at positions that are substantially symmetrical to each other across each of the torsion springs 61b and 61d. The coil is formed at a position that is substantially parallel to the scanning mirror surface 61a of the scanning mirror 61, and generates a magnetic field that is substantially parallel to the scanning mirror surface 61a when the scanning mirror surface 61a of the scanning mirror 61 is in a stop state. When electric current flows in the coil, the Lorentz force that is substantially vertical to the scanning mirror surface 61a is generated on the basis of the Fleming's left-hand rule.

The scanning mirror surface 61a rotates to reach a position at which the Lorentz force and restoring force of the torsion springs 61b and 61d are balanced to each other. For the torsion spring 61b, the scanning mirror surface 61a resonates when an alternate current is supplied to the coil at a resonance frequency of the scanning mirror surface 61a. Similarly, for the torsion spring 61d, the scanning mirror surface 61a, the torsion spring 61b and the supporting member 61c resonate when an alternate current is supplied to the coil at a resonance frequency of combination of the scanning mirror surface 61a and the supporting member 61c. In this manner, the resonance operations at the different resonance frequencies in two directions are achieved.

Figure 14:
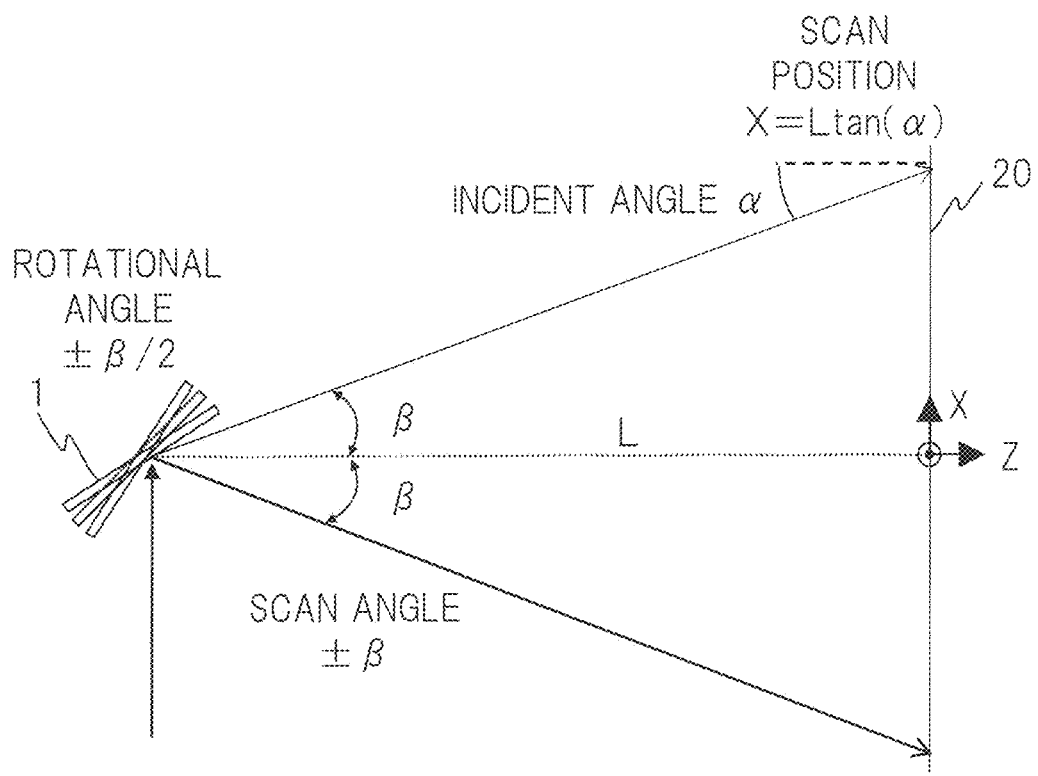
FIG. 14 is an explanatory diagram for explaining an outline of a light flux scan using a MEMS element in a working example.

In FIG. 14, when a rotational angle of the scanning mirror 61 that is the reflection surface of the optical scanning unit is set to "β/2", a scan angle that is an angle of the reflected optical rays changes by β that is twice the rotational angle. In this case, if no optical element is arranged between the scanning mirror 61 and an image plane 20, the scan angle β is equivalent to an incident angle "α" on the image plane 20. Therefore, a size of the scanned image for a certain projection distance is undesirably defined by the rotational angle β/2 of the scanning mirror 61. Therefore, in the present working example, in order to obtain a large screen for a short distance, an optical system (a concave lens or a convex mirror) is provided (but not illustrated) between the scanning mirror 61 shown in FIG. 12 and the windshield glass that is the projection surface, so that the above-described scanning amplitude is increased.

In the present example, the distance from the viewer to the image is short because the image is overlapped with the foreground view viewed by the viewer, and therefore, it is necessary to set an image display region in the horizontal direction to be larger than that in the vertical direction. Accordingly, the inventors and others have obtained an optimum value of an image display width through practical measurement while fitting 1.2 m to the fixed distance from the driver who is the viewer to the lower portion of the windshield glass. The inventors have found out that it is necessary to set the display range in the horizontal direction to be equal to or larger than 30 inches in order to display the left/right turn of the driven car by using an arrow in accordance with the rotational angle of the steering, and have found out that more favorable image display is achieved when display having a display range over 40 inches is achieved.

On the other hand, the inventors and others have found out that clear display is achieved when the display range in the vertical direction is 10 inches. Further, while it is necessary to increase the display range up to about 20 inches in order to enhance the visual recognition for the display, the inventors and others have verified that an image that is enough on a practical level is obtained when an upper limit is set to 15 inches since the increase in the amplitude in the vertical direction needs to the decrease in the amplitude in the horizontal direction in the driving of the MEMS.

Next, a first scanning state of the laser light scanning the image plane in the present configuration example will be described.

Figure 15:
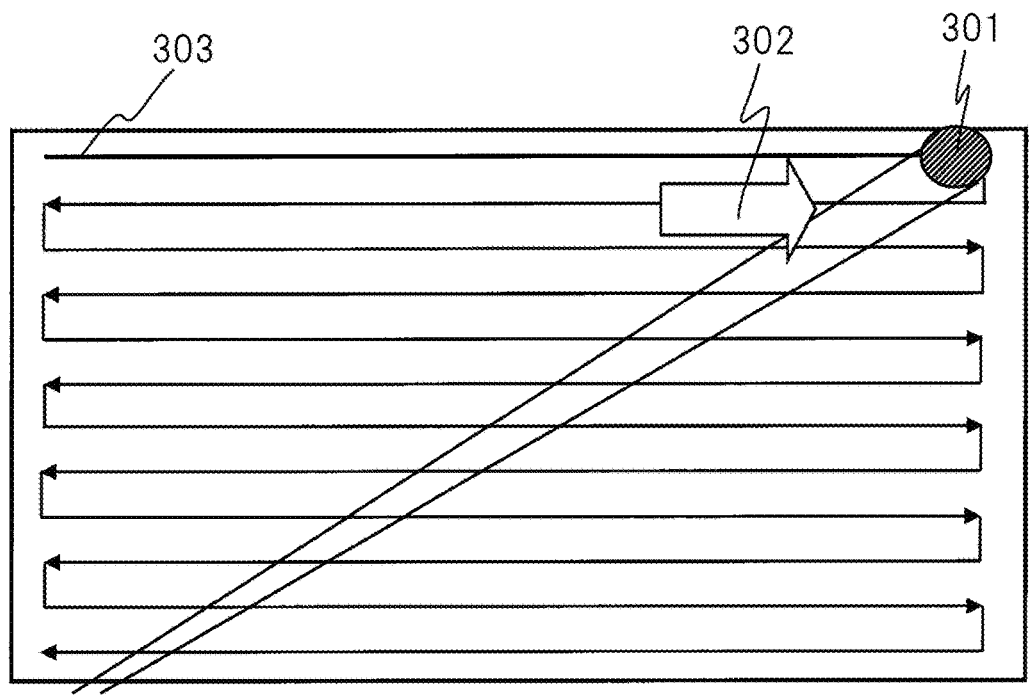
FIG. 15 is an explanatory diagram for a first scanning state of laser light with which a free curved mirror is scanned in a working example.

FIG. 15 shows the first scanning state of the laser light emitted from the optical scanning unit in the present configuration example. As described above, regarding the scanning range (amplitude) of the optical scanning unit in the present configuration example, an amplitude angle in the horizontal direction is set to be twice or more an amplitude angle in the vertical direction so that the image display range in the horizontal direction is larger than that in the vertical direction. A size of the laser light on the windshield glass is set to be one pixel, the windshield glass is scanned with the laser light 301 rightward from a left side in the horizontal direction, and then, is scanned from the right side to the left side after a scanned line is moved down by one pixel. A numerical symbol 302 indicates the scan track of the first scanning unit. A frame rate at which the image is switched may be 1/60 Hz when the driving speed of the car is 40 km/hour. However, by setting the frame rate to 1/120 Hz when the driving speed is 100 km/hour, a rewriting speed of the display image is increased in accordance with the driving speed of the car so that the optimal display is achieved.

In this case, as shown in an expression (3), the optical scanning unit in the present configuration example has substantially constant value "A" as a product of a frame frequency "F", a horizontal-polarization frequency "fh" and a vertical-polarization frequency "fv". Therefore, the frame rate is changed on the basis of the driving speed information of the car acquired from the driving assistance ECU 62 shown in FIG. 1 so that the horizontal-polarization frequency is decreased, and the polarization angle is proportionately decreased on the basis of the expression (3).

[Numerical Expression 3]

$$A=F(fh \times fv) \qquad (3)$$

As a result, although the horizontal-direction size of the image display is small as the image display range, the information display apparatus that does not cause the uncomfortableness in the usage can be obtained since a field of view of the driver is narrowed when the driving speed is high.

Figure 16:
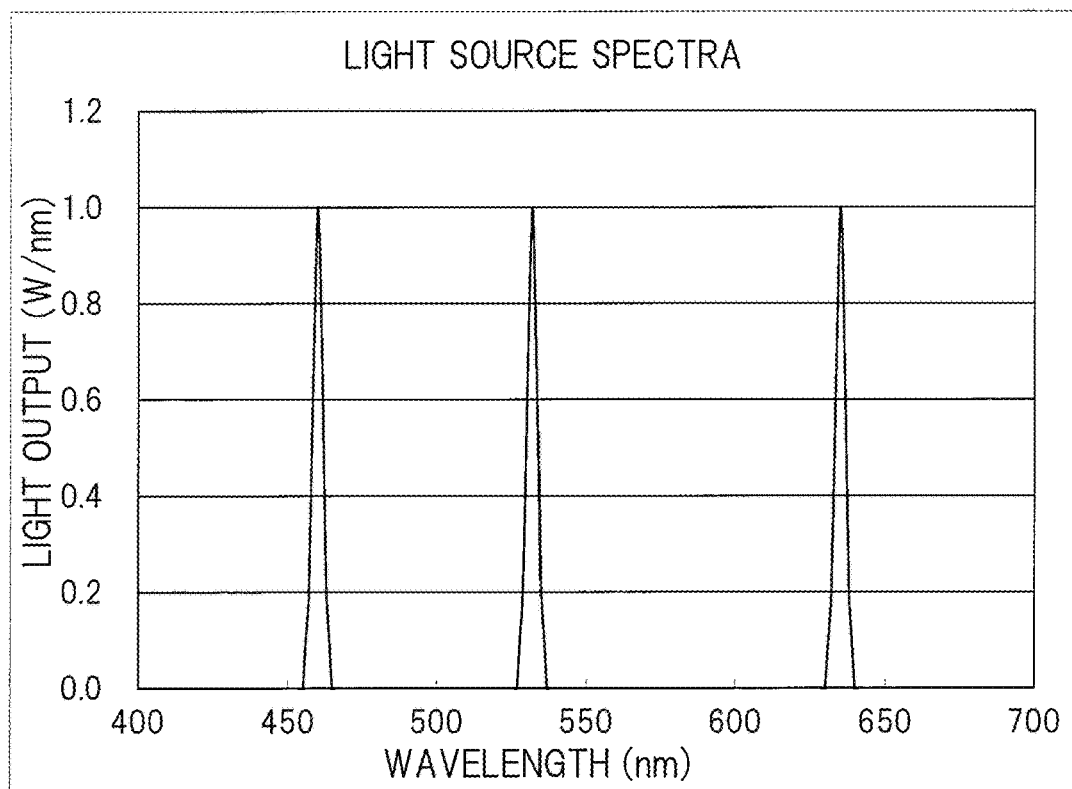
FIG. 16 is light spectra of a light source of a light scanning apparatus in a first scanning state in a working example.
Figures 17, 18:
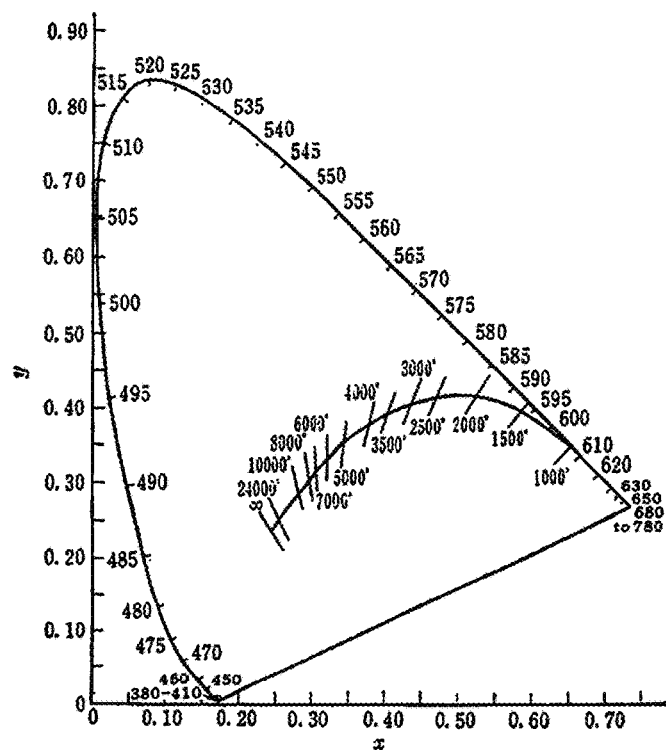
FIG. 17 is a black body locus and an isotemperature line diagram.
FIG. 18 is a chromaticity diagram of the light of the light source of the light scanning apparatus in the first scanning state in a working example.

In the first scanning state in the present configuration example, single-color laser light of three colors (red color (635 nm), green color (532 nm) and blue color (460 nm)) shown in FIG. 16 is used. FIG. 18 shows results of conversion of chromaticity in single-color light case and a synthesis case acquired in combination of the colors into coordinates on chromaticity diagram shown in FIG. 17, and shows that sufficient brightness has been obtained while covering a display color range of an NTSC mode since a chromatic purity of each single color is excellent.

Further, different-color light can be mixed at the time of emission of each single color. For example, the mixed-color light in a case of 100% emission of the blue-color laser light mixed with 10% of the maximum light emission of the green-color light at the same time as 5% of the maximum light emission of the red-color light causes a color that is equivalent to the blue color, and causes brightness that is twice or more. As described above, it has been also found out that the scanning unit of the mode of the present application can further improve the brightness of the virtual single-color light by using mixture of the different-color laser light instead of using the single-color laser light.

Next, a second scanning state of the laser light scanning the image plane in the present configuration example will be described.

Figure 19:
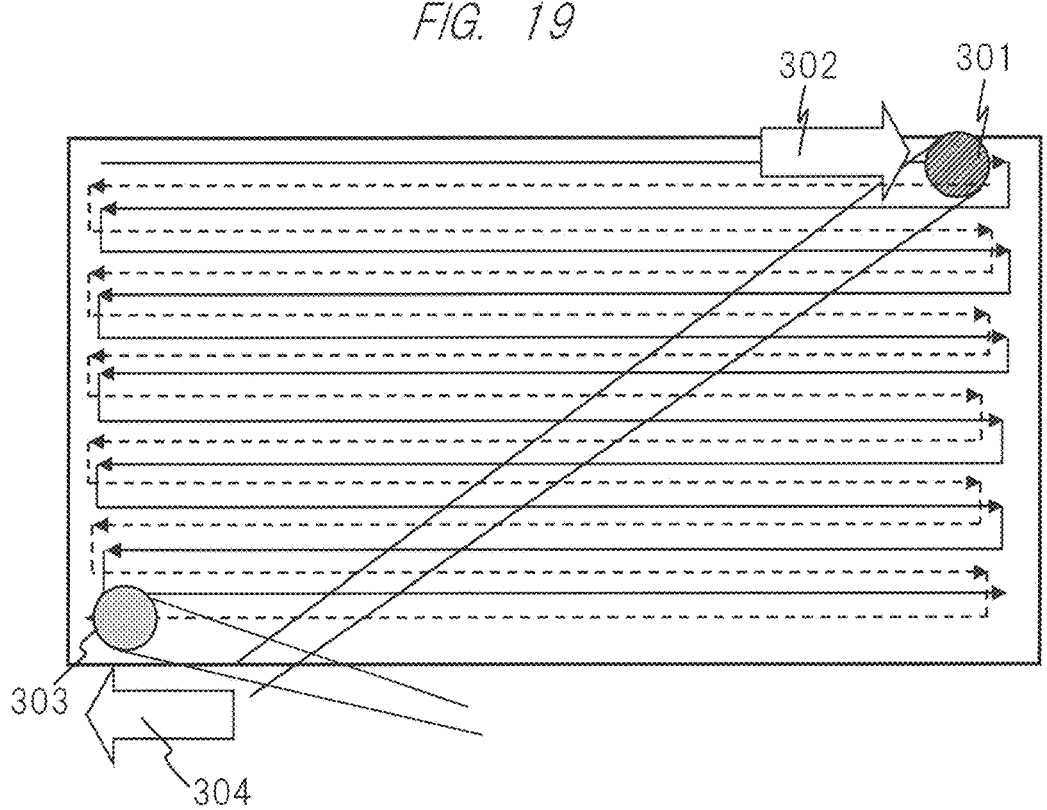
FIG. 19 is an explanatory diagram for a second scanning state of the laser light with which the free curved mirror is scanned in a working example.

FIG. 19 shows the second scanning state of the laser light emitted from the optical scanning unit in the present configuration example. A difference from the first scanning state is that a plurality of optical scanning units, that is, two optical scanning units that are the first scanning unit and the second scanning unit in FIG. 19 are arranged. Regarding the scanning range (amplitude) of the first scanning unit, the amplitude angle in the horizontal direction is set to twice the amplitude angle in the vertical direction or more so that the image display range in the horizontal direction is larger than that in the vertical direction. A size of the laser light 301 on the windshield glass is set to be one pixel, the windshield glass is scanned in the horizontal direction with beam, in other words, it is scanned from the left side to the right side along a track shown by a solid line in FIG. 19, and then, is scanned from the right side to the left side after a scanned line is moved down by one pixel. A numerical symbol 302 indicates the scan track of the first scanning unit.

On the other hand, regarding the scanning range (amplitude) of the second scanning unit, the amplitude angle in the horizontal direction is set to twice the amplitude angle in the vertical direction or more as similar to the first scanning unit so that the image display range in the horizontal direction is larger than that in the vertical direction. A size of the laser light 303 on the windshield glass is set to be one pixel, the windshield glass is scanned in the horizontal direction with beam, in other words, it is scanned from the left side to the right side along a track shown by a dashed line in FIG. 19, and then, is scanned from the right side to the left side after a scanned line is moved down by one pixel. Note that FIG. 19 shows a state in which the laser light 303 arrives at the last pixel on the lowest line. The scanning performed by the second scanning unit may be performed from an upper side to a lower side, or from the lower side to the upper side. A numerical symbol 304 indicates a scan track of the second scanning unit. In this case, an image of a next frame is displayed so that display of a next frame of the frame image that is displayed by the first scanning unit shifts by almost ½ frame.

Figure 20:
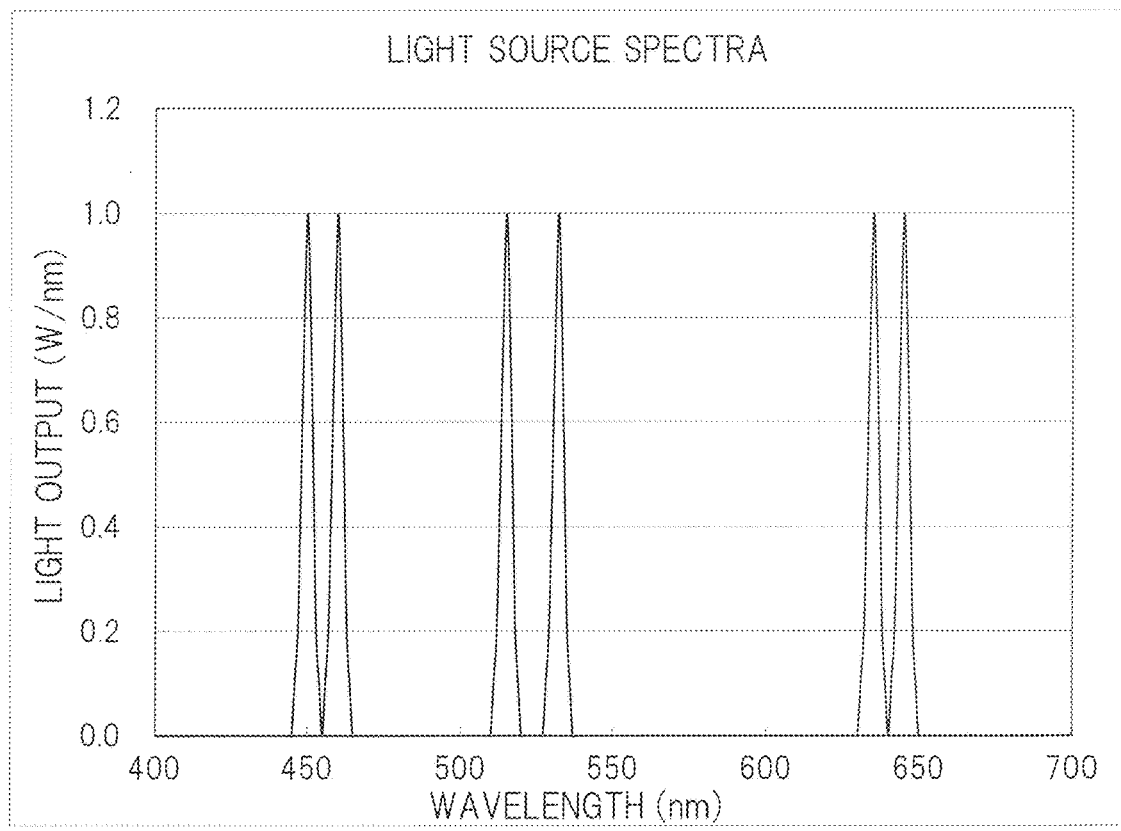
FIG. 20 is light spectra of a light source of alight scanning apparatus in a second scanning state in a working example.
Figures 21, 22:
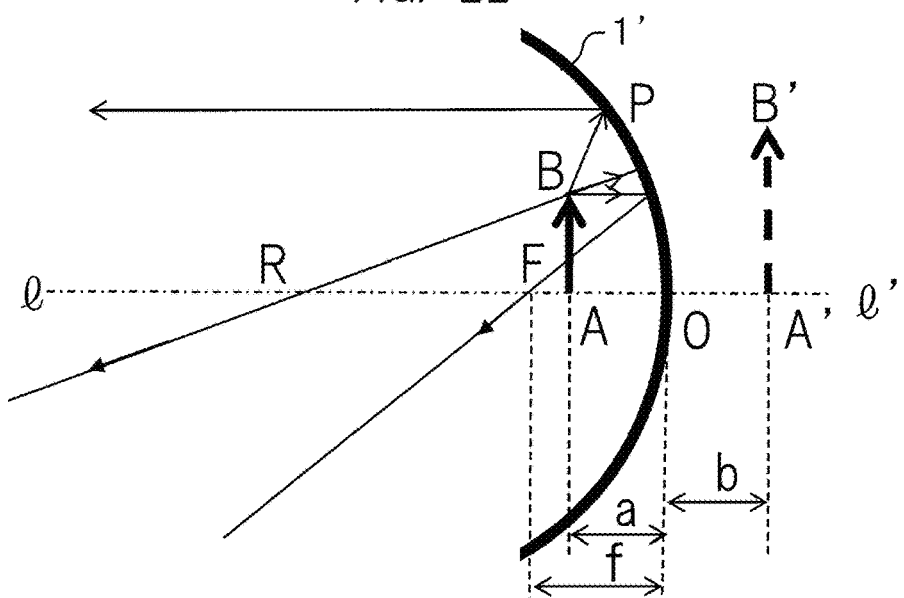
FIG. 21 is a chromaticity diagram of the light of the light source of the light scanning apparatus in the second scanning state in a working example.
FIG. 22 is a schematic diagram for explaining a principle of a virtual-image optical system according to a related art.

As a result, the inventors have found out that the frame rate can be virtually twice. Further, in the first scanning unit in the second scanning state, single-color laser light of three colors that are red color (635 nm), green color (532 nm) and blue color (460 nm)) shown in FIG. 20 is used. And, when single-color laser light of three colors that are red color (645 nm), green color (515 nm) and blue color (450 nm) shown in FIG. 20 is used in the second scanning unit, speckle can be also reduced. And, regarding chromaticity in single-color light case and a synthesis case acquired in combination of the colors, sufficient brightness has been obtained while covering the display color range of the NTSC mode since a chromatic purity of each single color of the laser light source configuring the two scanning unit is excellent as shown in FIG. 21.

The mixture of the different-color light at the time of the single-color light emission from each of the first scanning unit (referred to as (1) below) and the second scanning unit (referred to as (2) below), such as the mixed-color light, causes a color that is equivalent to the blue color, and causes brightness that is twice the brightness of the non-mix color light or more, the mixed-color light being generated in a case of 100% emission of the blue-color laser light (1) and (2) from the two scanning unit mixed with 5% of the maximum light emission of the green-color light (1) at the same time as 10% of the maximum light emission of the green-color light (2) and 5% of the maximum light emission of the red-color light (1).

As described above, it has been found out that the present configuration example can further improve the brightness of the virtual single-color light by using the mixture of the different-color laser light instead of using the single-color laser light even when the plurality of scanning units are used to be overlapped. In the present configuration example, the effect of the case of the simultaneous usage of the two scanning units has been described. However, it is needless to say that simultaneous usage of three or more scanning units can virtually increase the frame rate, and speckle noises can be also significantly reduced by the usage and the overlap of the laser light having different wavelengths from one another for the respective scanning units. The brightness can be also improved without losing the single-color chromaticity as described above. That is, the projection optical apparatus that is the second information display apparatus may be any apparatus as long as displaying the information as the practical image as different from the first information display apparatus.

<Specific Configuration of Instrument Panel>

Subsequently, a more specific configuration of the display using the instrument panel that is the above-described information display apparatus will be described below.

The instrument panel 42 shown in FIG. 1 is generally arranged on an inner radial portion of the steering 43, and therefore, the displayed image causes the largest point-of-view motion of the driver who is the viewer. Thus, except in the automatic driving of the car using the automatic driving mode, information having low urgency is displayed. When the point of view of the driver is sensed by the above-described viewing camera 210 to change the display image, a lot of image information can be effectively displayed for the driver.

The instrument panel may display various devices as they are. However, in order to thin the apparatus, it is preferable to use a liquid crystal panel. Particularly when interior design of the car is emphasized, a curved surface may be applied. When the display content is switched at a high speed so that the display speed is 120 Hz that is twice the frame rate (60 Hz) or 240 Hz that is four times the frame rate, real-time display of the image information or others from the viewing camera outside the car is achieved, and is favorable.

Second Working Example

The above-described information display apparatus has the image display region 1(a), the image display region 2(a) and the image display region 3 (a) as three types of the information display positions as shown in FIG. 3. On the other hand, in the present working example, for example, the viewing camera 210 shown in FIGS. 1 and 2 is used as a sensor for use in viewing the point-of-view motion of the driver who is the viewer. In this manner, in response to the information of the point-of-view motion of the viewer and the speed of the car, the respective images displayed at the three types of the information display positions are displayed in combination for optimal position, time and displayed content, so that the information display apparatus that is effective for the safety driving assistance can be provided. For example, it is thought up that control for change of the information display positions in a turning direction is performed in accordance with the point-of-view motion of the viewer at the time of the turning.

When display centers of the above-described three information display positions are arranged near a line including a rotational center axis of the steering, right and left point-of-view motions of the driver who is the viewer in the horizontal direction are equalized to each other, and therefore, an effect that suppresses the tiredness in the driving and an effect that minimizes the point-of-view motion can be obtained.

The information display apparatuses according to the various working examples of the present invention have been described above. However, the present invention is not limited to the above-described working examples, and include various modification examples. For example, in the above-described working examples, the entire system has been explained in detail for easily understanding the present invention, and the working examples are not always limited to the one including all structures explained above. Also, a part of the structure of one working example can be replaced with the structure of another working example, and besides, the structure of another working example can be added to the structure of one working example. Further, another structure can be added to/eliminated from/replaced with a part of the structure of each working example.

EXPLANATION OF REFERENCE CHARACTERS

1 . . . concave mirror, 1a . . . concave-mirror supporting unit, and 3 . . . optical element (lens), 4 . . . image display apparatus, 6 . . . projection-receiving member (windshield glass), 8 . . . eyebox (eyes of viewer), 10 . . . backlight source, 41 opening, 42 . . . instrument panel, 43 . . . steering, 44 . . . windshield cover, 45 . . . vehicle body, 50 . . . sun, 100 . . . HUD apparatus, 101 . . . car, 201 pixel, 202 . . . scan track of laser light, 210 . . . viewing camera, 220 . . . projection optical apparatus, 301 . . . laser light from first scanning unit, 302 . . . scan track of first scanning unit, 303 . . . laser light from second scanning unit, 304 . . . scan track of second scanning unit, 20 . . . display surface, 61 . . . scanning mirror, 1(a), 2(a), 3(a), 1(b), 2(b) and 3(b) . . . image display region

The invention claimed is:

1. An information display apparatus displaying image information onto a vehicle comprising:
a first information display apparatus and a second information display apparatus arranged between a windshield glass of the vehicle and an instrument panel of the vehicle,
wherein the instrument panel includes a direct-view type image display apparatus,
the first information display apparatus includes a virtual-image optical system displaying an image based on a virtual image onto a forward part of the vehicle by allowing a concave mirror to reflect light emitted from the image display apparatus displaying the image information, and allowing the windshield glass to reflect the reflected light, and
the second information display apparatus includes a practical-image optical system acquiring a practical image by projecting the light onto the windshield glass so that the practical image corresponds to the virtual image created by the first information display apparatus,
the first information display apparatus, the second information display apparatus and the instrument panel are arranged so that a center of a display position of each displayed image is near a line including a rotational center axis of a steering of the vehicle,
when a viewer who is a driver of the vehicle views the forward part of the vehicle, a first display region based on the first information display apparatus, a second display region based on the second information display apparatus, and a third display region based on the instrument panel are arranged in a vertical direction from an upper side to a lower side in this order,
the virtual image displayed in the first display region is arranged to be farther than the practical image displayed in the second display region in a depth direction, and
a horizontal-directional display position of the image to be displayed by at least one of the first information display apparatus and the second information display apparatus is changed in at least one of the first display region and the second display region in accordance with a speed of the vehicle so that the larger the speed is, the closer the display position is to a front side, while the smaller the speed is, the closer the display position is to a right or left side.

2. The information display apparatus according to claim 1,
wherein an optical element for use in suppressing a P-polarized wave component is arranged to be close to a light emission side of the image display apparatus of the first information display apparatus,
the concave mirror of the first information display apparatus has a function of reflecting visible light to the first display region and removing a light component other than the visible light,
the second information display apparatus displays the practical image by performing scanning with laser light of an S-polarized light flux to the second display region of the windshield glass, and
the second display region, based on the second display apparatus, on the windshield glass, has a property that has a reflectance against S-polarized waves different from a reflectance against P-polarized waves.

3. The information display apparatus according to claim 1,
wherein the first display region and the second display region are separate from each other.

4. The information display apparatus according to claim 1,
wherein a part or an entirety of the first display region and the second display region are overlapped with each other.

5. The information display apparatus according to claim 4,
wherein the first display region and the second display region are partially overlapped with each other in the depth direction.

6. The information display apparatus according to claim 1,
wherein a horizontal-directional display dimension of the first display region on the windshield glass in image display on the basis of the virtual image created by the first information display apparatus, viewed by the viewer through the windshield glass, is smaller than a horizontal-directional display dimension of the second display region in display of the practical image created by the second information display apparatus.

7. The information display apparatus according to claim 1, further comprising
a viewing camera for use in viewing a state including a point of view of the viewer in the vehicle,
wherein, on the basis of information of the state including the point of view of the viewer using the viewing camera, at least any of a display position, display time and a display content of each image displayed by the first and second information display apparatuses and the instrument panel changes, and
in turning of the vehicle, the display position of the first information display region or the second information display region is changed to follow a turning direction on the basis of information of motion of the point of view.

8. The information display apparatus according to claim 1, further comprising
a viewing camera for use in viewing a state including a point-of-view direction of the viewer in the vehicle,
wherein, on the basis of information of the state including the point-of-view direction of the viewer using the viewing camera,
a health state and sleepiness of the viewer are sensed, and attention-seeking image display is performed on the basis of the sensed information by using the first information display apparatus or the second information display apparatus.

9. The information display apparatus according to claim 1,
wherein the second information display apparatus displays the practical image by performing the scanning with the laser light to the second display region of the windshield glass by using a MEMS element, and
an optical system made of a concave lens or a convex mirror for use in enlarging the laser light out of the MEMS element is arranged between the MEMS element and the windshield glass.

10. The information display apparatus according to claim 1,
wherein the second information display apparatus displays the practical image by performing the scanning with the laser light to the second display region of the windshield glass by using a MEMS element, and
as a scan angle of the scanning of the MEMS element, a scan angle in a horizontal direction is twice a scan angle in a vertical direction.

11. The information display apparatus according to claim 1,
wherein the second information display apparatus displays the practical image by performing the scanning with the laser light to the second display region of the windshield glass by using a MEMS element, and
a frame rate of the image displayed in the second display region is changed in accordance with a speed of the vehicle so that the larger the speed, the larger the frame rate and the smaller a horizontal-directional dimension of the second display region.

12. The information display apparatus according to claim 1,
wherein the second information display apparatus displays the practical image by performing the scanning with the laser light to the second display region of the windshield glass by using a MEMS element,
in the second information display apparatus, the MEMS element includes a first MEMS element and a second MEMS element, and
the first MEMS element performs a first scanning on the second display region while the second MEMS element performs a second scanning thereon to shift by ½ frame from the first scanning.

* * * * *